US008315527B2

(12) United States Patent
Kimura

(10) Patent No.: US 8,315,527 B2
(45) Date of Patent: Nov. 20, 2012

(54) PASSIVE OPTICAL NETWORK SYSTEM AND OPTICAL LINE TERMINAL

(75) Inventor: Mitsunobu Kimura, Yokohama (JP)

(73) Assignee: Hitachi, Ltd., Tokyo (JP)

(*) Notice: Subject to any disclaimer, the term of this patent is extended or adjusted under 35 U.S.C. 154(b) by 204 days.

(21) Appl. No.: 12/913,615

(22) Filed: Oct. 27, 2010

(65) Prior Publication Data

US 2011/0103792 A1   May 5, 2011

(30) Foreign Application Priority Data

Oct. 28, 2009  (JP) ................................. 2009-247845

(51) Int. Cl.
*H04B 10/00* (2006.01)
(52) U.S. Cl. ...................... 398/168; 398/70; 398/167.5
(58) Field of Classification Search .................. 398/45, 398/57–58, 66–68, 70–72, 167.5, 168
See application file for complete search history.

(56) References Cited

U.S. PATENT DOCUMENTS

| | | | |
|---|---|---|---|
| 6,288,809 B1 | 9/2001 | Touma et al. | |
| 2009/0010650 A1* | 1/2009 | Tsuchiya et al. | 398/59 |
| 2009/0162063 A1* | 6/2009 | Mizutani et al. | 398/58 |
| 2009/0225914 A1* | 9/2009 | Ide et al. | 375/348 |
| 2009/0245790 A1* | 10/2009 | Mizutani et al. | 398/43 |
| 2010/0067913 A1* | 3/2010 | Niibe et al. | 398/98 |
| 2011/0217041 A1* | 9/2011 | Yoshida et al. | 398/58 |

FOREIGN PATENT DOCUMENTS

JP         11-122172         4/1999

OTHER PUBLICATIONS

IEEE, MAC Control; IEEE Std 802.3-2005, Chapter 31, 2005; pp. 415-423.
IEEE, Multipoint MAC Control; IEEE Std 802.3-2005; Chapter 64; 2005, pp. 243-298.
IEEE, Extensions of the Reconciliation Sublayer (RS) and Physical Coding Sublayer (PCS)/Physical Media Attachment (PMA) for 1000 BASE-X for multipoint links and forward error correction; IEEE Std 802.3-2005; Chapter 65, 2005; pp. 299-327.
IEEE; MAC Control opcode assignments; Amendment to IEEE Std 802-3.2008: CSMA/CD; Annex 31A; 2009; cover page + pp. 11-12.

* cited by examiner

*Primary Examiner* — Dzung Tran
(74) *Attorney, Agent, or Firm* — Foley & Lardner LLP

(57) ABSTRACT

A transmission speed of a protection (backup) line using 1G-OLT unit and 1G-ONU unit is set to be lower than a transmission speed of a working (primary) line using 10G-OLT unit and 10G-ONU unit. A priority and band of each communication service in ONU are preset individually and separately every LLID for a working (primary) line and a protection (backup) line. When bands are allocated to the protection (backup) line, the band allocation is performed so as to secure a minimum number of bands of each communication service. A monitoring controller refers to a predetermined band information table according to an operation state of the working (primary) line or the protection (backup) line with respect to a downstream signal packet.

17 Claims, 16 Drawing Sheets

REGISTERED ONU INFORMATION TABLE ~ 2000

| 10G-ONU MAC ADDRESS (OPERATOR INPUT) | 12:34:56:78:90:AB |
|---|---|
| 1G-ONU MAC ADDRESS (OPERATOR INPUT) | 12:34:56:78:90:AC |

10G DOWNSTREAM BAND INFORMATION TABLE ~ 2010-10

| ONU Port | LLID (APPEND) | DESTINATION MAC ADDRESS (AUTOMATIC DETECTION / PLURAL ADDRESSES POSSIBLE) | DESTINATION IP ADDRESS (AUTOMATIC DETECTION / PLURAL ADDRESSES POSSIBLE) | ASB(bit/s) (OPERATOR INPUT) |
|---|---|---|---|---|
| 1 | 12 | 65:65:11:22:33:44 | 14.221.25.81 | 50M |
| 2 | 13 | 78:90:AB:BB:CC:DD | 211.1.145.111 | 50M |
| 3 | 14 | 95:90:A5:91:B2:C3 65:68:1A:2B:3C:4D | 35.66.79.6 193.75.47.86 | 50M |

1G DOWNSTREAM BAND INFORMATION TABLE ~ 2010-1

| ONU Port | LLID (APPEND) | DESTINATION MAC ADDRESS (AUTOMATIC DETECTION / PLURAL ADDRESSES POSSIBLE) | DESTINATION IP ADDRESS (AUTOMATIC DETECTION / PLURAL ADDRESSES POSSIBLE) | ASB(bit/s) (OPERATOR INPUT) |
|---|---|---|---|---|
| 1 | 15 | 65:65:11:22:33:44 | 14.221.25.81 | 4M |
| 2 | 16 | 78:90:AB:BB:CC:DD | 211.1.145.111 | 10M |
| 3 | 17 | 95:90:A5:91:B2:C3 65:68:1A:2B:3C:4D | 35.66.79.6 193.75.47.86 | 1M |

10G UPSTREAM BAND INFORMATION TABLE ~ 2020-10

| ONU Port | LLID (APPEND) | ASB (bit/s) (OPERATOR INPUT) | |
|---|---|---|---|
| 1 | 12 | 50M | Tel |
| 2 | 13 | 50M | TV |
| 3 | 14 | 50M | PC/OTHER |

1G UPSTREAM BAND INFORMATION TABLE ~ 2020-1

| ONU Port | LLID (APPEND) | ASB (bit/s) (OPERATOR INPUT) | |
|---|---|---|---|
| 1 | 15 | 4M | Tel |
| 2 | 16 | 1M | TV |
| 3 | 17 | 1M | PC/OTHER |

FIG. 5

PASSIVE OPTICAL NETWORK SYSTEM AND OPTICAL LINE TERMINAL

CLAIM OF PRIORITY

The present application claims priority from Japanese patent application JP 2009-247845 filed on Oct. 28, 2009, the content of which is hereby incorporated by reference into this application.

BACKGROUND OF THE INVENTION

1. Field of the Invention

The present invention relates to a passive optical network system and an optical line terminal, and particularly to a passive optical network system and an optical line terminal in which plural optical network units share an optical transmission line.

2. Description of the Related Art

Passive Optical Network (PON) has Optical Line Terminal (OLT) and plural Optical Network Units (ONU). PON converts a signal from a terminal (PC or the like) connected to ONU to an optical signal, passes the optical signal through ONU, a branch (feeder) optical fiber and then an optical splitter while the optical signal is multiplexed optically (time-divisionally) with a main optical fiber to OLT, and then transmits the multiplexed signal to OLT. OLT receiving the optical signal executes various kinds of signal processing. As a result, in PON, communications from a terminal of some ONU to a terminal of another ONU of the PON concerned or a terminal connected to NW are executed.

Data transmitted from OLT to ONU is called as a downstream signal. The downstream signal is delivered from one main optical fiber to all ONUs through all branch optical fibers which are connected to the main optical fiber through optical splitters. Each ONU takes out only data addressed to the ONU itself from delivered data. Accordingly, a downstream band (data transmission position/time) usable every ONU is allocated to OLT in advance so as to prevent the downstream signal to be occupied by specific ONU.

Furthermore, there is executed band control in which OLT allocates an up band (data transmission position/time) of each ONU so that many data can be fairly transmitted through one optical fiber to as many ONUs as possible in accordance with a request from each ONU user.

On the other hand, a signal transmitted from plural ONUs to OLT is called as an upstream signal. For example, an Ethernet (registered trademark) frame signal is transmitted to the upstream signal and the downstream signal. Plural band allocating units which are called as Logical Link ID (LLID) are allocated to individual ONUs. An up transmission permitting timing is indicated every LLID. For example, there is known prior arts: JP-A-11-122172 entitled as "OPTICAL SUBSCRIBER NETWORK SYSTEM" (patent document 1), and IEEE Std. 802.3-2005, chapter 31, chapter 64 and chapter 65 (non-patent document 1) and IEEE Std. 802.3av-2009 Annex 31A (non-patent document 2).

The line speed of PON is increased, and thus it is possible for a user using PON to transmit/receive a larger capacity of data. Therefore, the number of the kinds of communication services to be used at a time in a PON line increases, and thus all the communication services indispensable to social life such as the Internet communication, telephones, television broadcast, are supplied by one PON optical fiber. However, conversely, when a trouble occurs in the PON system, all the communication services for user sides become scarce. Therefore, it is indispensable to reduce the non-communication time caused by the trouble of the PON system as maximum.

As a countermeasure, it is known a method of providing a protection (backup) line between OLT and ONU and switching to the protection (backup) line when PON trouble occurs. A method represented in FIG. 1 of the patent document 1 is known as an example of the construction.

In general, a circuit constructing a protection (backup) line has the same function as a normal circuit. The circuit is supplied with power under a standby state because it is necessary to quickly switch to the protection (backup) line when a trouble occurs.

Furthermore, increase of the speed of PON follows increase of power consumption. Accordingly, with respect to the circuit constructing the protection (backup) line, it is natural that increase of the speed thereof likewise increases power consumption. Therefore, PON having a protection (backup) line consumes power which is nearly twice as much as PON having no protection (backup) line at maximum per line, so that the increment of the power consumption caused by the increase of the speed increases twice at maximum. As the speed of PON is increased, it makes users perceive more clearly that power to be loaded for the protection (backup) line becomes excessive.

Therefore, as the speed of PON is increased, the protection (backup) line is required more and more as described above, and thus it is expected that mounting of protection (backup) line is more and more unavoidable.

SUMMARY OF THE INVENTION

An object of the present invention is to provide a passive optical network system and an optical line terminal that can reduce power consumption more greatly in an PON system having a protection (backup) line as compared with a case where a protection (backup) line is constructed according to a normal method.

The object of the present invention is attained by setting the communication speed of a protection (backup) line to be lower than the communication speed of a working (primary) line. Specifically, there may be considered 1) a method of the bit rate and the communication speed of the protection (backup) line in OLT and ONU are designed to be lower than those of the working (primary) line, whereby power consumed in circuits for the protection (backup) line is made lower than that of circuits for the working (primary) line, 2) a method of the priority and band of each communication service are preset separately for the working (primary) line and the protection (backup) line, and 3) a method of allocating bands of the protection (backup) line so that a minimum number of bands of each communication service can be respectively secured.

According to the present invention, there is provided a passive optical network system that has an optical network unit and an optical line terminal that are mutually connected to each other through an optical fiber, and in which a one protection (backup) line is provided to one optical network unit, and the transmission speed of the protection (backup) line is set to be lower than that of a working (primary) line.

In the passive optical network system, the communication speed of the protection (backup) line of the optical line terminal may be set to about $\frac{1}{10}$ of the communication speed of the working (primary) line.

In the passive optical network system, when the protection (backup) line is used, the communication capacity of a communication service which may be selected in advance can be secured.

In the passive optical network system, the optical network unit may store the up and downstream band set information of the working (primary) line and the protection (backup) line every optical line terminal.

In the passive optical network system, the working (primary) line and the protection (backup) line may be designed as different fibers.

In the passive optical network system, the working (primary) line and the protection (backup) line may be constructed in one fiber by wavelength multiplexing. In this case, the protection (backup) line of the optical line terminal may share the wavelength of the upstream line with the working (primary) line while using a different wavelength from the working (primary) line for only the downstream line.

According to the first solving means of this invention, there is provided a passive optical network system having optical network units (ONU) and an optical line terminal (OLT) that are mutually connected to one another through optical fibers,
the ONU comprising:
a high-speed ONU unit that executes ONU communication processing containing separating processing of a downstream signal packet and assembling processing of an upstream signal packet, and transmits an optical frame at a first transmission speed; and,
a low-speed ONU unit that executes the ONU communication processing, and transmits an optical frame at a second transmission speed lower than the first transmission speed;
and
the OLT comprising:
a shaper unit that receives data from a network and adjusts a flow rate of a data signal;
a high-speed OLT unit that executes OLT communication processing containing extraction processing of extracting a destination address and a link identifier of each terminal connected to the ONU from the upstream signal packet and assembling processing of a downstream signal packet, and transmits an optical frame at the first transmission speed;
a low-speed OLT unit that executes the OLT communication processing and transmits an optical frame at the second transmission speed lower than the first transmission speed;
an OLT switch unit that is connected to the shaper unit and switches the high-speed OLT unit or the low-speed OLT unit;
a registered ONU information table that stores addresses of the high-speed ONU unit and the low-speed ONU unit with respect to each ONU;
a high-speed downstream band information table that stores a destination address extracted from the upstream signal packet from the ONU and a band assurance value (ASB) of the downstream signal, in association with a link identifier with respect to each ONU;
a low-speed downstream band information table that stores a destination address extracted from the upstream signal packet from the ONU and ASB of a downstream signal having a lower value than the high-speed downstream band information table, in association with a link identifier different from the high-speed downstream band information table with respect to each ONU; and
an OLT monitoring controller that writes data into the high-speed downstream band information table or the low-speed downstream band information table or reads out data therefrom, specifies a flow rate of data to the shaper unit and switches the switch unit;

wherein
the high-speed OLT unit and the low-speed OLT unit extract a link identifier and a destination address in the upstream signal packet received from the ONU, and
when the destination address is not recorded in the high-speed lower band information table or the low-speed downstream band information table, the OLT monitoring controller writes the destination address on a line coincident with the link identifier extracted from the upstream signal packet in the high-speed downstream band information table and/or the low-speed downstream band information table;
when the OLT receives a downstream signal packet from a network, the OLT monitoring controller extracts a transmission source address in the downstream signal packet, and checks the transmission source address with a destination address stored in the high-speed downstream band information table or the low-speed downstream band information table under operation,
when a destination address coincident with the transmission source address extracted from the downstream signal packet is stored, the OLT monitoring controller sets to the shaper unit ASB and a link identifier set in the address in the high-speed downstream band information table or the low-speed downstream band information table under operation, the shaper unit processes the downstream signal packet, and
when an address coincident with the transmission source address extracted from the downstream signal is not stored in the high-speed downstream band information table or the low-speed downstream band information table under operation, the OLT monitoring controller applies to the shaper unit ASB and a link identifier predetermined and set to data whose type is low in priority in the high-speed downstream band information table or the low-speed downstream band information table under operation, the shaper unit processes the downstream signal packet; and
in a case where the OLT monitoring controller detects that a trouble occurs in the high-speed OLT unit during operation of the OLT and the ONU at the first transmission speed, when the OLT monitoring controller confirms that no trouble occurs in the low-speed OLT unit and the low-speed ONU unit of the ONU, the OLT transmits a switch notification from the first transmission speed to the second transmission speed to plural ONUs connected to the OLT by using a line of the second transmission speed, and
the OLT monitoring controller controls the OLT switch unit to switch the plural ONUs and plural lines connected to the respective ONUs to the low-speed OLT unit side, and changes ASB of the shaper unit so that the low-speed downstream band information table is applied.

According to the second solving means of this invention, there is provided an optical line terminal (OLT) in a passive optical network system having an optical network units (ONU) and an optical line terminal (OLT) that are mutually connected to one another through optical fibers, wherein the ONU comprising: a high-speed ONU unit that executes ONU communication processing containing separating processing of a downstream signal packet and assembling processing of an upstream signal packet, and transmits an optical frame at a first transmission speed; and, a low-speed ONU unit that executes the ONU communication processing, and transmits an optical frame at a second transmission speed lower than the first transmission speed,
the optical line terminal (OLT) comprising:
a shaper unit that receives data from a network and adjusts a flow rate of a data signal;
a high-speed OLT unit that executes OLT communication processing containing extraction processing of extracting a destination address and a link identifier of each terminal connected to the ONU from the upstream signal packet and assembling processing of a downstream signal packet, and transmits an optical frame at the first transmission speed;

a low-speed OLT unit that executes the OLT communication processing and transmits an optical frame at the second transmission speed lower than the first transmission speed;

an OLT switch unit that is connected to the shaper unit and switches the high-speed OLT unit or the low-speed OLT unit;

a registered ONU information table that stores addresses of the high-speed ONU unit and the low-speed ONU unit with respect to each ONU;

a high-speed downstream band information table that stores a destination address extracted from the upstream signal packet from the ONU and a band assurance value (ASB) of the downstream signal, in association with a link identifier with respect to each ONU;

a low-speed downstream band information table that stores a destination address extracted from the upstream signal packet from the ONU and ASB of a downstream signal having a lower value than the high-speed downstream band information table, in association with a link identifier different from the high-speed downstream band information table with respect to each ONU; and an OLT monitoring controller that writes data into the high-speed downstream band information table or the low-speed downstream band information table or reads out data therefrom, specifies a flow rate of data to the shaper unit and switches the switch unit;

wherein the high-speed OLT unit and the low-speed OLT unit extract a link identifier and a destination address in the upstream signal packet received from the ONU, and when the destination address is not recorded in the high-speed lower band information table or the low-speed downstream band information table, the OLT monitoring controller writes the destination address on a line coincident with the link identifier extracted from the upstream signal packet in the high-speed downstream band information table and/or the low-speed downstream band information table;

when the OLT receives a downstream signal packet from a network, the OLT monitoring controller extracts a transmission source address in the downstream signal packet, and checks the transmission source address with a destination address stored in the high-speed downstream band information table or the low-speed downstream band information table under operation, when a destination address coincident with the transmission source address extracted from the downstream signal packet is stored, the OLT monitoring controller sets to the shaper unit ASB and a link identifier set in the address in the high-speed downstream band information table or the low-speed downstream band information table under operation, the shaper unit processes the downstream signal packet, and when an address coincident with the transmission source address extracted from the downstream signal is not stored in the high-speed downstream band information table or the low-speed downstream band information table under operation, the OLT monitoring controller applies to the shaper unit ASB and a link identifier predetermined and set to data whose type is low in priority in the high-speed downstream band information table or the low-speed downstream band information table under operation, the shaper unit processes the downstream signal packet; and in a case where the OLT monitoring controller detects that a trouble occurs in the high-speed OLT unit during operation of the OLT and the ONU at the first transmission speed, when the OLT monitoring controller confirms that no trouble occurs in the low-speed OLT unit and the low-speed ONU unit of the ONU, the OLT transmits a switch notification from the first transmission speed to the second transmission speed to plural ONUs connected to the OLT by using a line of the second transmission speed, and the OLT monitoring controller controls the OLT switch unit to switch the plural ONUS and plural lines connected to the respective ONUs to the low-speed OLT unit side, and changes ASB of the shaper unit so that the low-speed downstream band information table is applied.

As disclosed in the patent document 1, a general protection (backup) line is constructed by the same circuit as the working (primary) line. Therefore, when a protection (backup) line is provided, nearly double power consumption occurs per line as compared with a case where no protection (backup) line is provided. However, according to the present invention, the power consumption of the circuit constituting the protection (backup) line is reduced to less than half and more than one tenth of the power consumption of the circuit of the working (primary) line. Accordingly, there can be implemented a PON system in which communication is not intercepted even under failure because the protection (backup) line is provided, and also the increment of power consumption per line can be suppressed to several tens percentages of the power consumption when no protection (backup) line is provided.

Furthermore, the circuit constituting the protection (backup) line is lower in line speed, and thus the circuit scale is smaller. Therefore, the PON system of this invention gains an advantage over a PON system having a general protection (backup) line in space, heating amount and cost.

Still furthermore, when flow of communication data is switched to a line having a lower line speed, the flow rate of the communication data must be generally restricted by using a shaper function. In the PON system, an upstream signal is originally transmitted by the same mechanism as the shaper function from the property of PON, and thus it is unnecessary to add the shaper function to ONU. That is, as compared with a PON system having a general protection (backup) line, only the circuit scale of the protection (backup) line can be compared in ONU, and thus the circuit scale of ONU according to the present invention can be made smaller.

BRIEF DESCRIPTION OF THE DRAWINGS

FIG. 5 is a diagram showing an example of a band information table according to the embodiment;

DETAILED DESCRIPTION OF PREFERRED EMBODIMENT

Figure 1:
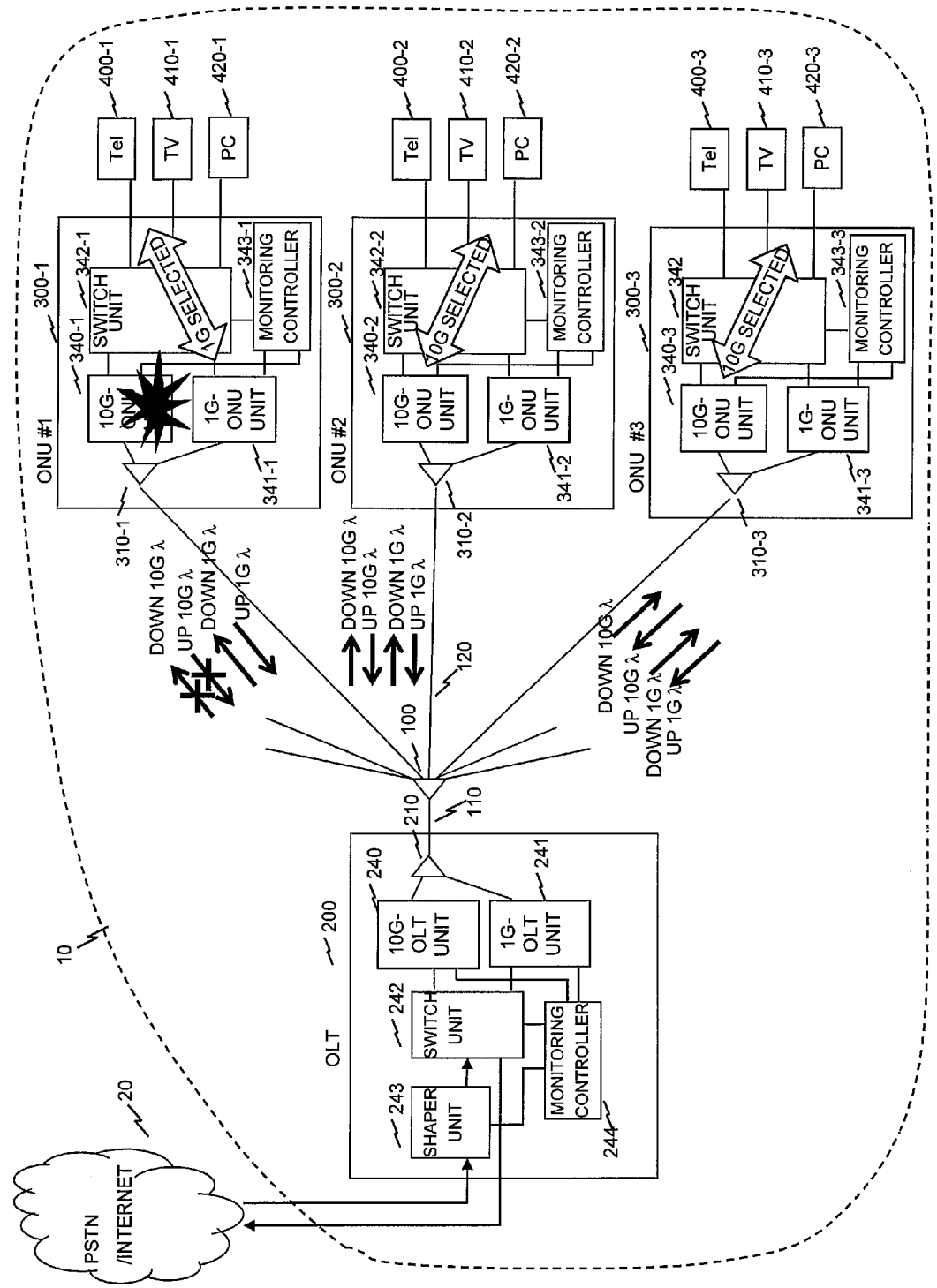
FIG. 1 is a block diagram showing a PON system having a protection (backup) line according to an embodiment of the present invention.

An embodiment according to the present invention will be described with reference to the accompanying drawings. The substantially same sites are represented by the same reference numerals, and thus the duplicative description thereof is omitted.

1. System Construction

A PON system according to an embodiment of the present invention will be described with reference to FIG. 1.

Here, FIG. 1 is a functional block diagram of the PON system.

In FIG. 1, PON 10 is connected to a PSTN/Internet 20 to transmit/receive data. PON 10 has an optical splitter 100, a main (trunk) fiber 110, branch lines 120, OLT 200, ONUs 300, telephones 400, TVs 410 and personal computers (PC) 420. OLT 200 has a 10G-OLT unit 240, a 1G-OLT unit 241, a switch unit 242, a shaper unit 243, and a monitoring controller 244. OLT 200 is connected to the main fiber 110 through a WDM filter 210. OLT 200 is connectable to plural (for example, 32) ONUs 300 through one main fiber 110, the optical splitter 100 and plural (for example, 32) branch fibers 120. As an example, three ONUs are shown in FIG. 1. ONU 300 has a WDM filter 310, a 10G-ONU portion 340, a 1G-ONU portion 341, a switch unit 342 and a monitoring controller 343.

Here, the OLT portion and the ONU portion which are adapted to the transmission speeds of 1G and 10G will be described. However, the present invention is not limited to these transmission speeds and a proper transmission speed may be used.

The PON system transmits/receives a continuous digital signal between OLT 200 and ONU 300 in the form of packets obtained by sectioning the continuous digital signal with start and end identification signals. Address information called as two Media Access Control (MAC) addresses representing a transmission source and a destination is recorded in each packet to be transmitted, and OLT 200 or ONU 300 receiving a packet transfers the packet concerned to equipment having the MAC address concerned which is connected to the OLT 200 or ONU 300 concerned. Since the same packets are transmitted from OLT 200 to plural ONUs 300 in a multiple addressing style, it is necessary for ONU 300 to identify only the packet addressed thereto for the purpose of telesecurity of communication (preventing bugging of communication), and thus an identifier called as Logical Link ID (LLID) which is individually allocated to each ONU 300 is installed at the head portion of each packet. LLID is issued when the monitoring controller 244 of OLT 200 registers ONU 300. The minimum unit of LLID is set to one LLID per ONU 300, however, an operator may register plural LLID for one ONU 300 in order to make one ONU 300 operate as if plural ONUs 300 exist with respect to OLT 200.

Furthermore, in PON 10, data are transmitted/received between the 10G-OLT unit 240 and the 10G-ONU portion 340, and also data are transmitted/received between the 1G-OLT unit 241 and the 1G-ONU portion 341. A different light wavelength is used in accordance with each combination of these portions. The multiplexing and separation of these light wavelengths are performed in the WDM filters 210 and 310.

The operation of PON 10 on a downstream signal will be described.

Data from the PSTN/Internet 20 are passed through the shaper unit 243 and input to the switch unit 242. According to an instruction of the monitoring controller 244, the shaper unit 243 adjusts a flow rate of data signals to the switch unit 242. The switch unit 242 selects a designation of data signal transmission from the 10G-OLT unit 240 or the 1G-OLT unit 241 and switches to the selected unit. The wavelengths of optical signals from the 10G-OLT unit 240 and the 1G-OLT unit 241 are different from each other, and these signals are transmitted through the WDM filter 210 to one main fiber 110 and branched to plural ONUs through the optical splitter 100.

The data signal which is separated every wavelength in the WDM filter 310 of ONU 300 through the optical fiber 120 is allocated to the 10G-ONU portion 340 or the 1G-ONU portion 341 in accordance with the wavelength. Each of the 10G-ONU portion 340 and the 1G-ONU portion 341 converts the received optical signal to an electrical signal, and transmits the electrical signal to the switch unit 342. The switch unit 342 selects and switches the data signal from the 10G-ONU or the 1G-ONU according to an instruction of the monitoring controller 343, and transmits the selected data signal to the telephone 400, TV 410 or PC 420.

Next, the operation on an upstream signal will be described.

The switch unit 342 of ONU 300 receives a data signal from the telephone 400, TV 410 or PC 420, selects and switches to the 10G-ONU portion 340 or the 1G-ONU portion 341 according to an instruction of the monitoring controller 343 to transmit the data signal to the selected unit. The wavelengths of optical signals from the 10G-ONU portion 340 and the 1G-ONU portion 341 are different from each other. In this example, there are totally four kinds of wavelengths for the up and downstream signals. These signals are transmitted through the WDM filter 310 to one optical fiber 120. With respect to the wavelength, in place of four kinds, plural kinds of ONU portions and OLT portions may be provided and plural proper kinds of wavelengths may be used. The signal from the ONU is combined with a signal from other ONUs through the optical splitter 100, passed through the main fiber 110, subjected to wavelength separation in the WDM filter 210 of redundant type OLT, and then allocated to the 10G-OLT unit 240 or the 1G-OLT unit 241 every wavelength. The switch unit 242 selects and switches a signal from the 10G-OLT unit 240 or the 1G-OLT unit 241 according to an instruction of the monitoring controller 244, and transmits the selected signal to the PSTN/Internet 20. A transmission timing from each ONU 300 is adjusted by a proper method as described in Chapter 64 of the non-patent document 1 so as to prevent an upstream signal from being simultaneously transmitted from different ONUs 300, for example.

Furthermore, FIG. 1 shows that a trouble occurs in the 10G-ONU portion 340-1 of ONU 300-1. At this time, the monitoring controller 343-1 makes an instruction to the switch unit 342-1 to select and switch a signal of the 1G-ONU portion to perform signal transmission/reception. Since no trouble occurs in the other ONUs 300-2 and 300-3, the switch units 342-2 and 342-3 selects the 10G-ONU portions 340-2 and 340-3, respectively. In OLT 200, the monitoring controller 244 makes an instruction to the shaper unit 243 and the switch unit 242 and selects and switches to the 1G-OLT unit 241 with respect to only the signal to be transmitted/received to/from ONU 300-1.

The basic construction of the 10G-ONU portion 340 of ONU 300 will be described with reference to FIG. 2.

Figure 2:
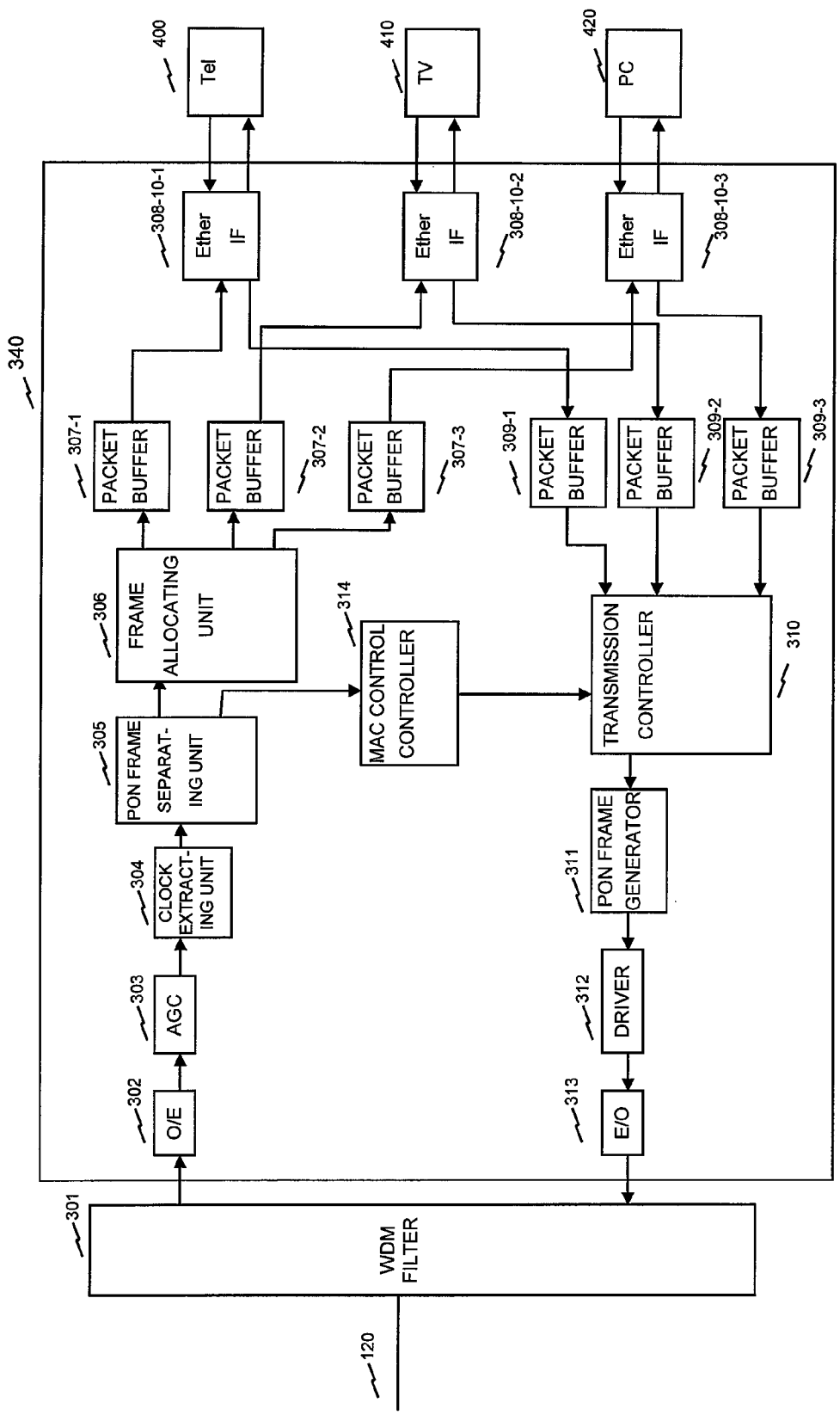
FIG. 2 is a functional block diagram of ONU.

Here, FIG. 2 is a functional block diagram of the 10G-ONU portion 340. In order to simplify the description, the switch unit 342 is omitted from FIG. 2. In FIG. 2, the 10G-ONU portion 340 has a WDM filter 301, an O/E converter 302, Automatic Gain Control (AGC) 303, a clock extracting unit 304, a PON frame separator 305, a frame allocating unit 306, packet buffers 307, and EtherIFs (interfaces) 308 for downstream signals. The 10G-ONU portion 340 has EtherIFs 308-10, packet buffers 309, a transmission controller 310, a PON frame generator 311, a driver 312 and an E/O converter 313 for upstream signals. The 10G-ONU portion 340 is further equipped with a MAC Control controller 314.

The optical signal received from the branch fiber 120 is subjected to wavelength separation in the WDM filter 301, converted to an electrical signal in the O/E converter 302, controlled in Automatic Gain Control (AGC) 303 so that the amplitude value thereof is constant, subjected to re-timing in the clock extracting unit 304 and subjected to signal separation in the PON frame separator 305. The control frame is transmitted to the MAC Control controller 314, and data signal frames other than the control frame are transmitted to the frame allocating unit 306. An Ether signal output from the frame allocating unit 306 is temporarily stored in the packet buffers 307-1 to 307-3, and then the thus-stored Ether signals are passed through the EtherIFs 308-10-1 to 308-10-3 and then output.

Furthermore, the signals input from the EtherIFs 308-10-1 to 308-10-3 are temporarily stored in the packet buffers 309-1 to 309-3 respectively, read out under the control of the transmission controller 310 and then assembled into a PON frame in the PON frame generator 311. The assembled signal is converted to current in a driver 312, and the thus-converted current is converted to an optical signal in the E/O converter 313, passed through the WDM filter 301 and then transmitted to the branch fibers 120. The transmission controller 310 transmits packets to OLT 200 on the basis of a transmission permission value extracted from the MAC Control controller.

The frame allocating unit 306 allocates the packets to the packet buffers 307-1 to 3 every different LLID to store the packets in the packet buffers. Furthermore, the transmission controller 310 applies different LLIDs to the packets in accordance with the packet buffers 309-1 to 3.

Furthermore, the operation of the 1G-ONU portion 341 can be likewise described with reference to FIG. 2 except that the processing speed is different.

The construction of the periphery of the switch unit 342 of ONU 300 in FIG. 1 will be described with reference to FIG. 3.

Figure 3:
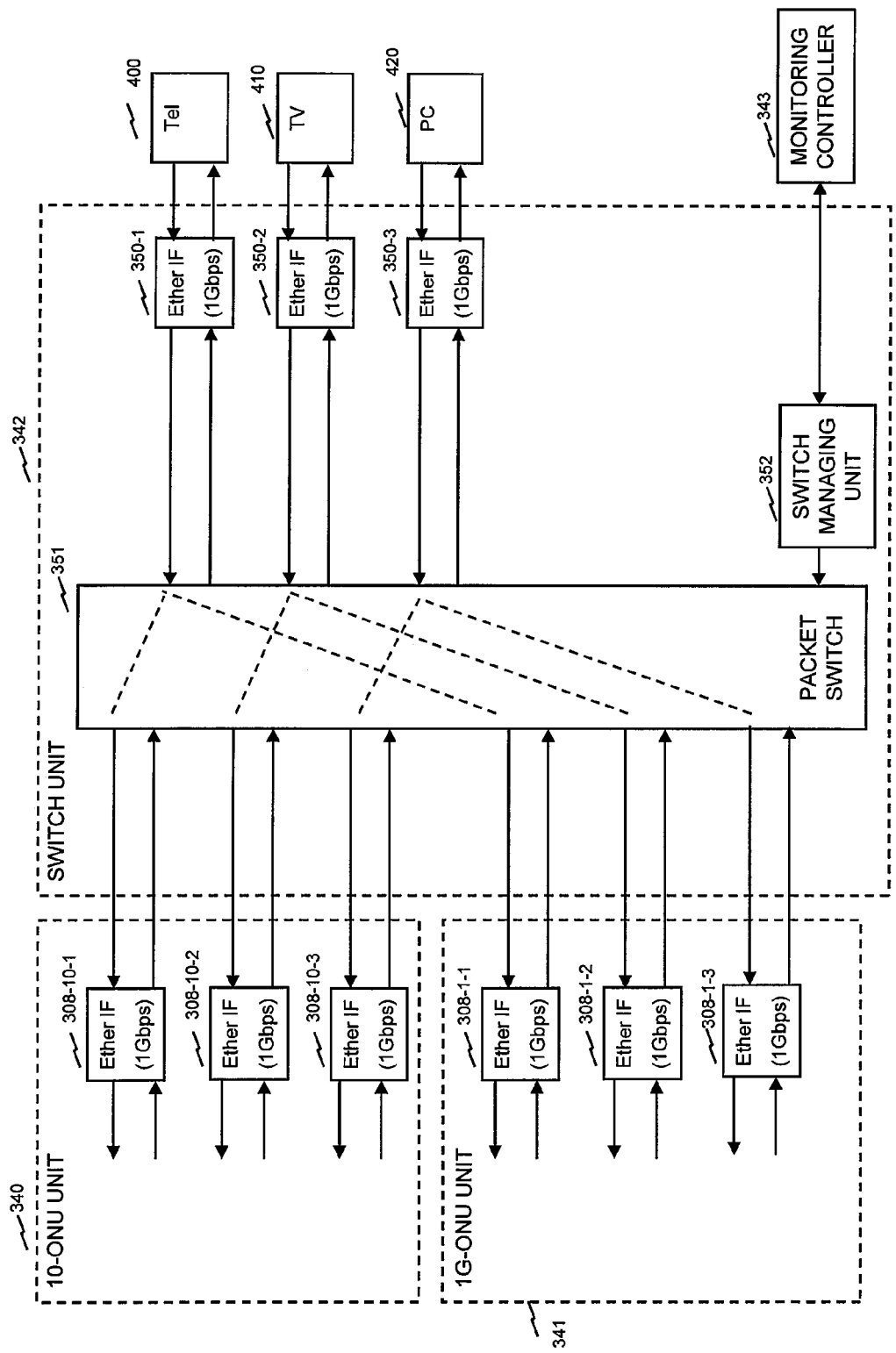
FIG. 3 is a functional block of a packet switch periphery of ONU according to the embodiment.

Here, FIG. 3 is a functional block diagram of the periphery of the switch unit of ONU. In FIG. 3, the 10G-ONU portion 340 and the 1G-ONU portion 341 are connected to the switch unit 342, and the monitoring controller 343, the telephone 400, TV 410 and PC 420 are connected to the switch unit 342.

The switch unit 342 has a packet switch 351 and a switch managing unit 352. The switch managing unit 352 transmits/receives a control signal to/from the monitoring controller 343, controls the packet switch 351 and reports the state of the packet switch 351. EtherIFs 350-1 to 350-3 are connected to the packet switch 351, and EtherIFs 308-10-1 to 308-10-3 of the 10G-ONU portion 340 are connected to the EtherIFs 350-1 to 350-3 in this order in one-to-one correspondence. By the switching operation of the packet switch 351, EtherIFs 350-1 to 350-3 are connected to the switchIFs 308-1-1 to 308-1-3 of the 1G-ONU portion 341 in this order in one-to-one correspondence. In this example, in order to simplify the circuit of ONU 300, it is assumed that all the bit rates of the switchIF 308 and the EtherIF 309 are set to 1 Gbps.

The operation of the shaper unit and the switch unit in OLT 200 will be described with reference to FIG. 4.

Figure 4:
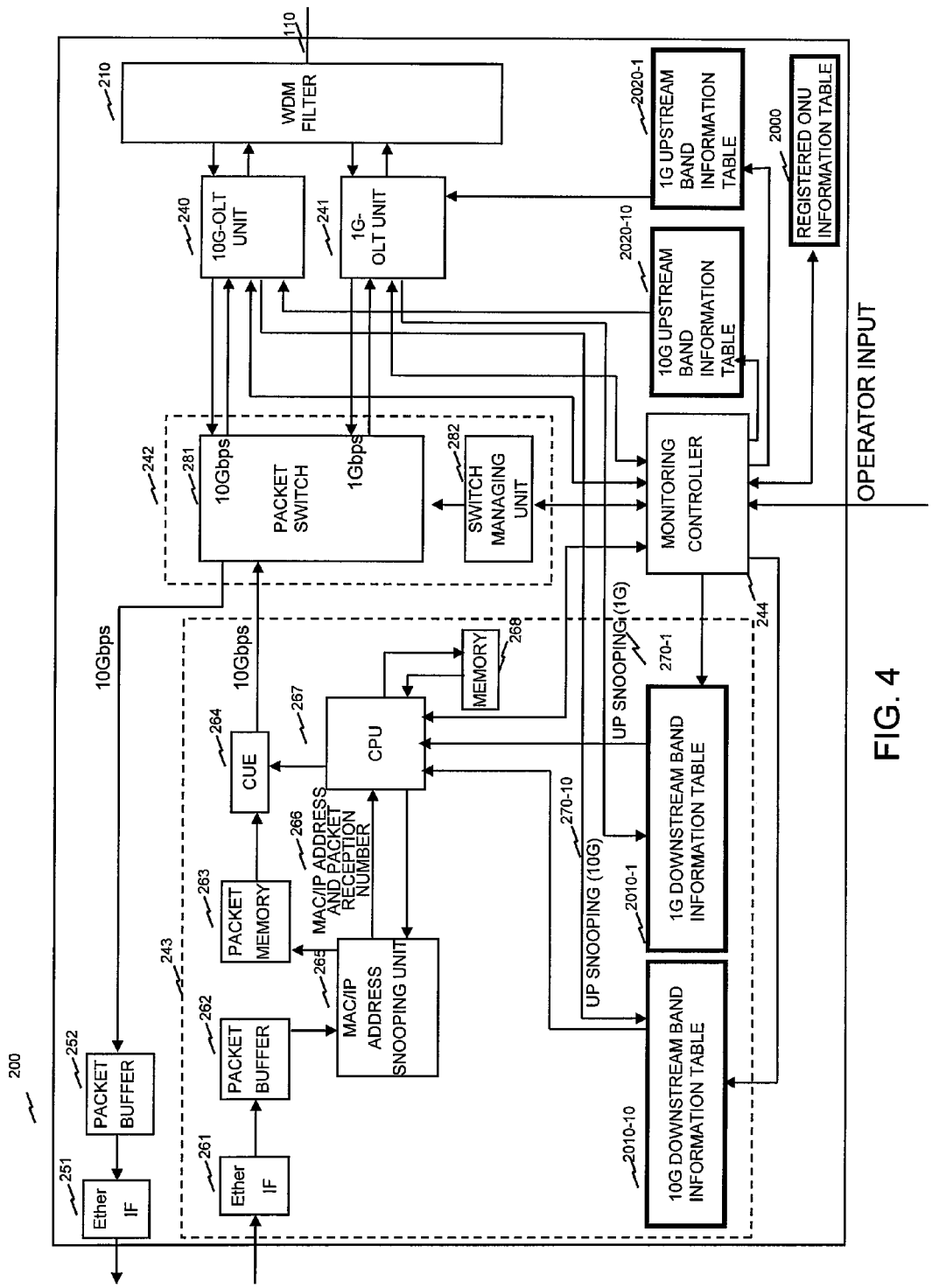
FIG. 4 is a functional block diagram of OLT according to the embodiment.

Here, FIG. 4 is a functional block diagram of OLT 200. In FIG. 4, the shaper unit 243 is connected to the switch unit 242, and also connected to the monitoring controller 244. The switch unit 242 is connected to the 10G-OLT unit 240, the 1G-OLT unit 241, the packet buffer 252 and EtherIF 251. Furthermore, the 10G-OLT unit 240 and the 1G-OLT unit 241 are connected to the WDM filter 210, and the monitoring controller 244 is connected to an upstream band information table 2020. In OLT 200, LLID, the data packet and the control signal are installed to generate a PON packet, and the transmission function to ONU is executed in the 10G-OLT unit 240 and the 1G-OLT unit 241.

Furthermore, a registered ONU information table 2000 is connected to the monitoring controller 244. The downstream band information table 2010 is connected to the monitoring controller 244 and CPU 267.

The shaper unit 242 executes time-adjustment to the data signal received from EtherIF 261 in the packet buffer 262, and then passed through a MAC/IP address Snooping unit 265 and temporarily stored in a packet memory 263. CPU 267 instructs a cue 264 to transfer the data signal from the packet memory 263 to the switch unit 242. In the MAC/IP address Snooping unit 265, a transmission source MAC address and an IP address 266 are obtained from the data signal, passed through CPU 267 and temporarily stored in the memory 268.

The switch unit 242 has a packet switch 281 and a switch managing unit 282, and according to an instruction of the monitoring controller 244, the switch unit 242 selectively switches to any one of the 10G-OLT unit 240 and the 1G-OLT unit 241 and transfers a data signal of a downstream line transmitted from the cue 264 to the selected unit. Then, the data signals of the downstream line of the 10G-OLT unit 240 and the 1G-OLT unit 241 are input to the WDM filter 210, subjected to wavelength-multiplexing into one optical fiber and then transmitted to the main fiber 110.

Furthermore, upstream signals received from the main fiber 110 are subjected to wavelength separation in the WDM filter 210, and then transferred to the 10G-OLT unit 240 or the 1G-OLT unit 241 every wavelength. The packet switch 281 receives data signals of the upstream line from the 10G-OLT unit 240 and the 1G-OLT unit 241. Here, the monitoring controller 244 selectively switches to the 10G-OLT unit 240 or the 1G-OLT unit 241, transmits the data signal of the upstream line through the selected unit to the packet buffer 252, and further transmits the data signal through EtherIF 251 to NW.

The construction of the band information table in OLT will be described with reference to FIG. 5.

Here, FIG. 5 shows the band information table applied to one ONU 300 managed by OLT 200. The band information table contains the registered ONU information table 2000, the downstream band information table 2010 and the upstream band information table 2020. OLT 200 creates a set of band information tables whose number corresponds to the number of ONU 300 connected to OLT 200.

An operator inputs MAC addresses possessed by the 10G-ONU unit 340 and the 1G-ONU unit 341 with respect to one ONU 300, and the monitoring controller 244 of OLT 200 records the MAC addresses into the registered ONU information table 2000. When ONU 300 is actually connected, ONU 300 transmits a registration request signal to OLT 200, and the monitoring controller 244 of OLT 200 extracts the MAC address of the ONU 300 concerned from the registration request signal, and collates the MAC address concerned for collation, and permits registration of the ONU 300 concerned when the MAC address is coincident.

The monitoring controller 244 of OLT 200 appends the same LLID to ONU port numbers 1 to 3 of the downstream band information table 2010 and the upstream band information table 2020 allocated to one ONU 300. However, The LLIDs of the respective ONU ports of the 10G-ONU unit and the 1G-ONU unit are different from each other. The monitoring controller 244 of OLT 200 registers, into the downstream band information table 2010, a band assurance value (Assured Bandwidth; ASB) of the downstream signal of each LLID input by the operator. This is to set the lowest bit rate assured by each LLID. Furthermore, the monitoring controller 244 of OLT 200 registers ASB of the upstream signal of each LLID input by the operator into the upstream band information table 2020.

As an example of an idea when the operator sets ASB described above, three ports of ONU are set to the same large values under 10 Gbps operation, however, the band is set to be one tenth as large as the band under a normal state under 1 Gbps operation of a protection (backup) line. Therefore, an application and a level of importance of each port are set in advance, and ASB is set according to them. In FIG. 5, as an example, ASBs in the 10G downstream band information table 2010-10 and the 10G upstream band information table 2020-10 are set to 50 Mbps at each port thereof. However, in the 1G downstream band information table 2010-1 as an example, the port 1 is set to 4M for the purpose of IP telephone, the port 2 is set to 10M for the purpose of reception of IPTV signals, and the port 3 is set to 1M for the purpose of PC data communication and another communication purpose. In the 1G upstream band information table 2020-1, the band of the upstream signal may be small and thus it may be set to 1M because the purpose of the port 2 is to receive the IPTV signals.

Furthermore, the monitoring controller 244 of OLT 200 registers a plurality of addresses concerning a destination MAC address and a destination IP address in each LLID into the downstream band information table 2010. The destination MAC address and the destination IP address are addresses extracted from the upstream signal from ONU in the 10G-OLT unit 240 and the 1G-OLT unit 241 by the monitoring controller 244 of OLT 200. The monitoring controller 244 of OLT 200 extracts and compares the destination MAC address and the destination IP address and the transmission source address and the transmission source IP address contained in the downstream signal to determine LLID to which the downstream signal is allocated.

Here, the band setting of the downstream signal will be described with reference to FIGS. 4 and 5 again.

The monitoring controller 244 writes the band set value of each LLID input by the operator into the downstream band information table 2010. Furthermore, the monitoring controller 244 extracts the destination MAC address, the destination IP address and LLID from an upstream signal packet in the 10G-OLT unit 240 and the 1G-OLT unit 241, and records the extracted data into the downstream band information table 2010 (one or both of the 10G downstream band information table 2010-10 and the 1G downstream band information table 2010-1). At this time, the monitoring controller 244 stores the destination MAC address, the destination IP address and LLID extracted by the 10G-OLT unit 240 into both the 10G downstream band information table 2010-10 and the 1G downstream band information table 2010-1. Furthermore, the monitoring controller 244 may store these data extracted by the 10G-OLT unit 240 into only the 10G downstream band information table 2010-10. Likewise, the monitoring controller 244 stores the destination MAC address, the destination IP address and the LLID extracted by the 1G-OLT unit 241 into both the 10G downstream band information table 2010-10 and the 1G downstream band information table 2010-1. Alternatively, the monitoring controller 244 may store these data extracted by the 1G-OLT unit 241 into only the 1G downstream band information table 2010-1.

Here, the transmission source MAC address and the IP address obtained in the MAC/IP address Snooping unit 265 are temporarily saved in the memory 268, and CPU 268 collates them with the destination MAC address and the destination IP address recorded in the downstream band information table 2010. If there are the same addresses, CPU 268 adds the data signal packet with priority and LLID according to LLID and the ASB set value to be referred to, and control the cue 264. At this time, according to an instruction of the monitoring controller 244, CPU 267 selects and refers to any one of 10G and 1G of the downstream band information table 2010. When there is no same address as a result of the collation, CPU 267 sets ASB and adds LLID according to a basic set value which is set in another manner, and controls the cue 264.

The band setting of the upstream signal will be further described with reference to FIG. 3. The monitoring controller 244 writes the ASB set value input by the operator into the upstream band information table 2020. Furthermore, the 10G-OLT unit 240 and the 1G-OLT unit 241 reads out the ASB set value of the upstream band information table 2020, and instructs ONU 300 to perform band setting in the upstream signal every LLID.

The construction of the control signal between OLT 200 and ONU 300 will be described with reference to FIG. 6.

Figure 6:
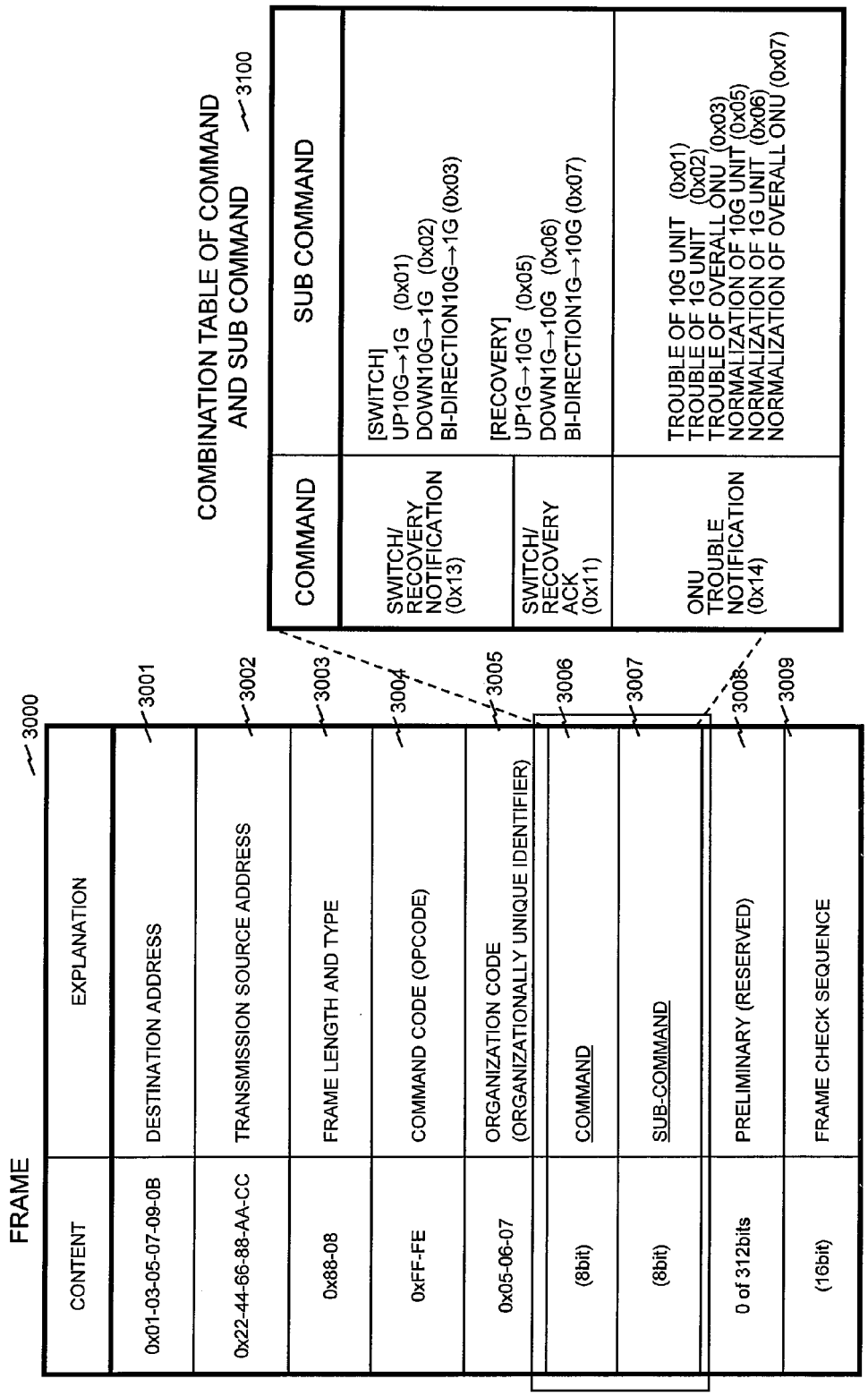
FIG. 6 is a diagram showing a message construction and a command list between OLT and ONU to make a switching instruction between a line being used presently and a protection (backup) line, etc.

Here, FIG. 6 shows a frame construction content of the control signal based on a predetermined specification which is expressed in the non-patent document 2 or the like. However, in place of this frame construction content, this embodiment may be applied to another proper frame construction content. In FIG. 6, a frame 3000 has a frame construction of a control signal packet used in the upstream signal and the downstream signal between OLT 200 and ONU 300. The top content is placed at the head of the frame, and subsequent contents are allocated in the descending order in the frame. Numeral values expressed by 0x in FIG. 6 means hexadecimal. ONU 300 or OLT 200, or the MAC address of equipment connected to the front side of them is input to the destination address 3001, the transmission source address 3002. Fixed values are input to a frame length and type 3003. A command code 3004 represents an application of the frame 3000, and 0xFF-FE which means a frame for which a control content can be freely defined by a specific organization is set in the command code 3004. Here, a numerical value allocated to a specific organization is set into an organization code 3005 by the operator.

Information concerning trouble notification, switching notification and recovery notification for a working (primary) line and a protection (backup) line is represented by a command 3006 and a sub command 3007. The others are a preliminary 3008 as a remainder of the frame length and a frame check sequence 3009 for detecting a bit error of the frame.

The command and the sub command are represented by a combination table 3100 of the command and the sub command. In this example, there are three kinds of commands of notification of switching or recovery, ACK for switching or recovery and ONU trouble notification. The sub command is defined in each command to finalize the command. The type of the switching/recovery, the direction of up/down, discrimination of 10G unit/1G unit and discrimination of trouble/normalization are performed.

2. Operation Sequence

The operation of the PON system will be briefly described with reference to FIG. 7.

Figure 7:
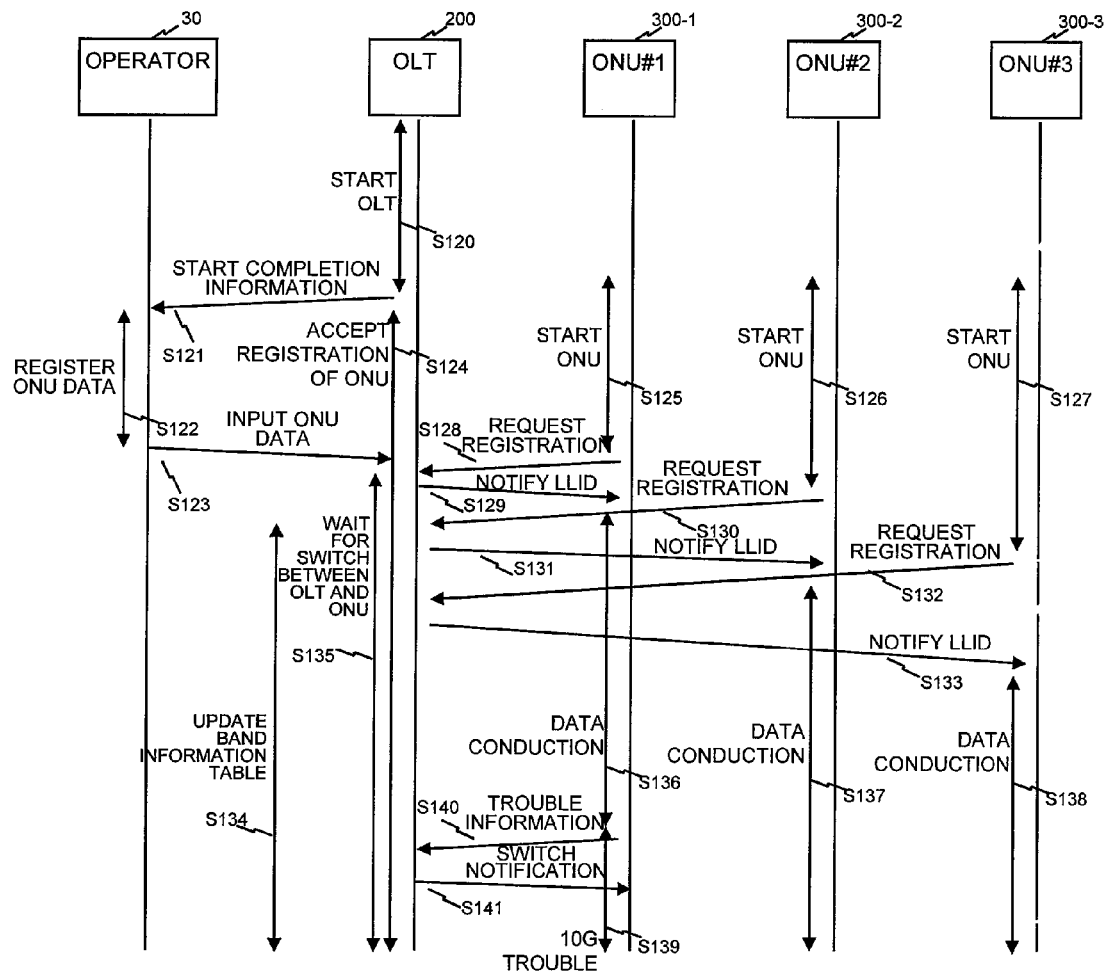
FIG. 7 is a sequence diagram showing the basic operation of a PON system having a protection (backup) line according to the embodiment.

Here, FIG. 7 is a sequence diagram showing the basic operation among an operator, OLT and ONU. In FIG. 7, when OLT 200 starts (S120) and transmits start completion information to the operator 30 (S121), OLT 200 accepts registration of ONU (S124). Therefore, the operator 30 inputs information concerning ONU 300 to be connected (S122), and the MAC addresses of the 10G-ONU unit and the 1G-ONU unit of each ONU 300 are registered in the registered ONU information table 2000 of OLT 200 (S123). The details of the input content is shown in FIG. 5.

Subsequently, when ONU 300 starts (S125 to 127), it makes an ONU registration request for itself to OLT 200 (S128, S130, S132). OLT 200 extracts the MAC address of ONU from the upstream signal from ONU 300. When the extracted MAC address is registered in the registered ONU information table 2000, OLT 200 accepts the registration request of ONU 300, appends LLID to ONU 300 and notifies the LLID concerned (S129, S131, S133). ONU 300 to which LLID is notified starts data conduction (S136 to 138). However, in this embodiment, three LLIDs are appended to one ONU, so that ONU 300 actually does not start the data conduction until three LLIDs are notified. However, this process is omitted in FIG. 7.

OLT 200 starts update of the downstream band information table 2010 when the data conduction of ONU 300 is started (S134). That is, as described above, the monitoring controller 244 of OLT 200 stores the destination MAC address, the destination IP address and LLID extracted by the 10G-OLT unit 240 into both the 10G downstream band information table 2010-10 and the 1G downstream band information table 2010-1. Alternatively, the monitoring controller 244 may store these data extracted by the 10G-OLT unit 240 into only the 10G downstream band information table 2010-10. Likewise, the monitoring controller 244 stores the destination MAC address, the destination IP address and LLID extracted by the 1G-OLT unit 241 into both the 10G downstream band information table 2010-10 and the 1G downstream band information table 2010-1. Alternatively, the monitoring controller 244 may store these data extracted by the 1G-OLT unit 241 into only the 1G downstream band information table 2010-1. Furthermore, OLT 200 waits for switching of the OLT unit/ONU unit when ONU data are registered by the operator 30 (S123) (S135).

Here, when a trouble occurs in the 10G-ONU unit 340-1 of one ONU 300-1 (S139), the trouble information is notified to OLT 200 on the basis of the control signal described with reference to FIG. 6 (the command and the sub command of the ONU trouble notification) (S140), and OLT 200 transmits to the ONU 300-1 concerned a switching notification from the 10G line to the 1G line (S141).

The operation of the PON system when a trouble occurs in the working (primary) line of the ONU 300 as a single unit is described with reference to FIG. 8.

Figure 8:
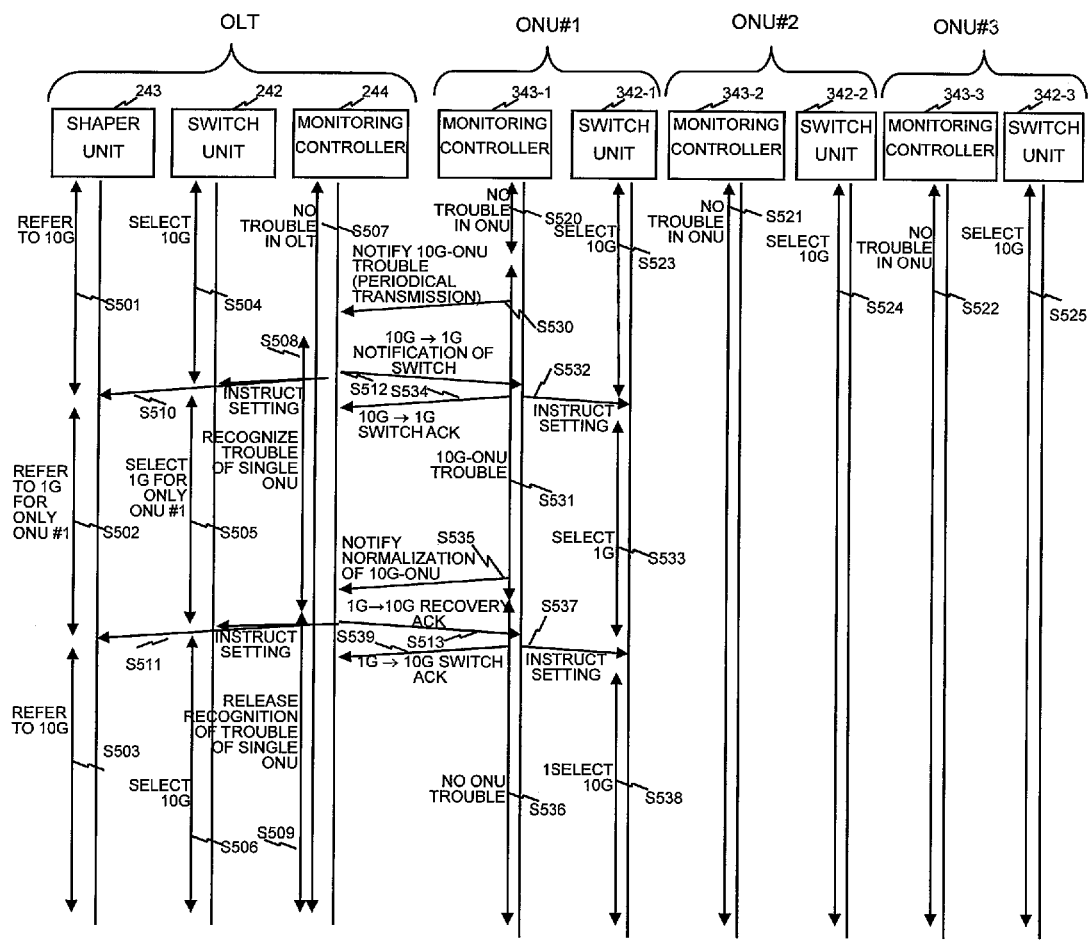
FIG. 8 is a sequence diagram when ONU and OLT are switched to 1G portion due to a 10G portion trouble of the ONU as a single unit according to the embodiment, and then the trouble is eliminated and thus they are restored to 10G portion.

Here, FIG. 8 is a sequence diagram showing the operation of OLT 200 and plural ONUs 300. In FIG. 8, the shaper unit 243, the switch unit 242 and the monitoring controller 244 of OLT 200, and the monitoring controllers 343 and the switch units 342 in ONUs 300#1 to #3 operate normally.

Since the monitoring controller 244 is under a state that it has no OLT trouble information (S507), the shaper unit 243 refers to the 10G downstream band information table 2010-10 (S501), and all the switch units 242 select the 10G-OLT unit 240 side (S504). Furthermore, since the monitoring controllers 343 in the ONUs #1 to #3 have no ONU trouble information (S520 to S522), the switch unit 342 selects the 10G-ONU unit 340 (S523 to S525).

Here, when the monitoring controller 343-1 of ONU #1 detects that a trouble occurs in the 10G-ONU unit 340-1 (S531), a trouble of the 10G-ONU unit 340-1 is notified to OLT 200 (S530). This trouble notification is periodically transmitted to OLT during a period when the trouble exists.

The monitoring controller 244 of OLT 20 which receives the trouble notification from ONU #1 determines that the trouble is a trouble of ONU as a single unit because it receives no trouble notification from other ONUs (S508), and transmits to ONU #1 a switch notification from the 10G line to the 1G line (S512). Furthermore, the monitoring controller 244 transmits a setting instruction to the switch unit 242 and the shaper unit 243 of OLT (S510). The switch unit 242 selects the 1G-OLT unit 241 side with respect to only the line of the ONU #1 (S505), and the reference destination of the shaper unit 243 is changed to the 1G downstream band information table 2010 with respect to only the line of ONU #1 (S502).

ONU #1 which receives the switch notification (S512) from OLT 200 transmits a setting instruction to the switch unit 342-1 by the monitoring controller 343-1 (S532), and the switch unit 342-1 selects the 1G-ONU unit 341-1 (S533). After the setting is completed, the monitoring controller 343-1 checks that the switch from the 10G line to the 1G line is completed, and transmits switch ACK to OLT 200 (S534). At this time, since no trouble occurs in ONUs #2 and #3, no switch notification is transmitted from OLT 200, and thus they continue to operate by using the 10G line as the working (primary) line.

Subsequently, when the monitoring controller 343-1 of ONU #1 detects that the trouble of ONU #1 is eliminated (S536), the monitoring controller 343-1 transmits a normalization notification of the 10G-ONU unit to OLT 200 (S535). Therefore, the monitoring controller 244 of OLT 200 transmits to ONU #1 a notification of recovery (recovery notification) from the protection (backup) line (1G) to the working (primary) line (10G) (S513). Furthermore, the monitoring controller 244 transmits a setting instruction to the switch unit 242 and the shaper unit 243 (S511), the switch unit 242 selects the 10G-OLT unit 240 side at the line of ONU #1 (S506), and the shaper unit 243 changes the reference destination to the 10G downstream band information table 2010-10 at the line of ONU #1 (S503).

ONU #1 which receives the switch notification (S513) from OLT 200 transmits a setting instruction to the switch unit 342-1 by the monitoring controller 343-1 (S537), and the switch unit 342-1 selects the 10G-ONU unit 340-1 (S538). After the setting is completed, the monitoring controller 343-1 checks that the recovery from the 1G line to the 10G line is completed, and then transmits recovery ACK to OLT (S539).

Next, the operation of the PON system when a trouble occurs at the 10G side of OLT will be described with reference to FIG. 9.

Figure 9:
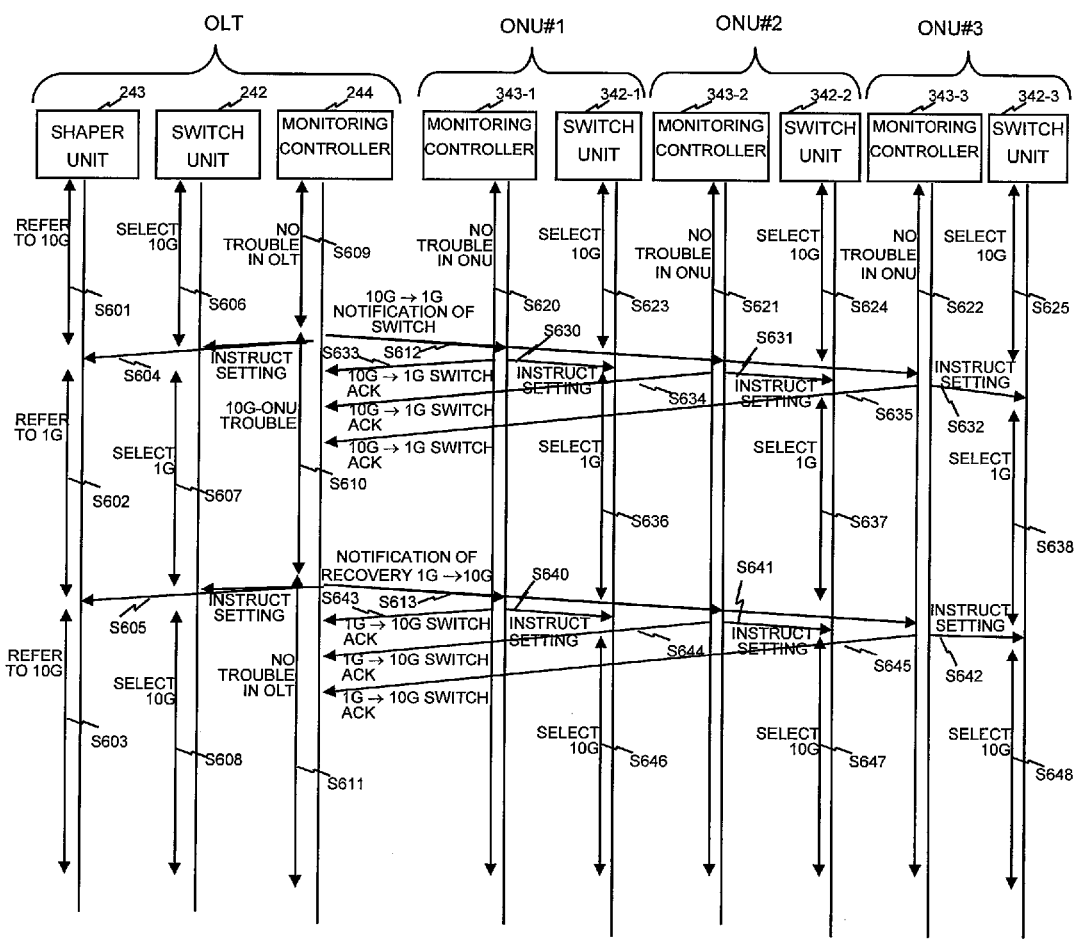
FIG. 9 is a sequence diagram when OLT and ONU of all portions are switched to 1G portion due to 10G portion trouble of OLT according to the embodiment, and then the trouble is eliminated and thus they are restored to 10g portion.

Here, FIG. 9 is a sequence diagram of the operation of OLT 200 and ONU 300 when a trouble occurs at the 10G side of OLT. In FIG. 9, the shaper unit 243, the switch unit 242 and the monitoring controller 244 of OLT 200 and the monitoring controllers 343 and the switch units 342 of the ONUs 300#1 to #3 operate normally.

Since the monitoring controller 244 is under the state that it has no OLT trouble information (S609), the shaper unit 243 refers to the 10G downstream band information table 2010-10 (S601), and all the switch units 242 select the 10G-OLT unit 240 (S606). Furthermore, since the monitoring controllers 343 in ONUs #1 to #3 have no ONU trouble information (S620 to S622), the switch unit 342 selects the 10G-ONU unit 340 (S623 to S625).

Here, when the monitoring controller 244 detects that a trouble occurs in the 10G-OLT unit 240 of OLT 200 (S610), the monitoring controller 244 transmits to all ONUs 300 a notification of the switch from the working (primary) line (10G) to the protection (backup) line (1G) (S612). Furthermore, the monitoring controller 244 transmits a setting instruction to the switch unit 242 and the shaper unit 243 of OLT 200 (S604), the switch unit 242 selects the 1G line (S607) and the shaper unit changes the reference destination to the 1G downstream band information table 2010-1 (S602).

At each ONU 300 receiving the switch notification from OLT 200, the monitoring controller 343 instructs the switch unit 342 to select the 1G line (S630 to S632), and the switch unit 342 selects the 1G-ONU unit 341 (S636 to S638). After the setting is completed, the switch ACK from the 10G line to the 1G line is transmitted to OLT 200 (S633 to S635).

Subsequently, when the monitoring controller 244 detects that the trouble of the 10G unit of OLT 200 is eliminated (S611), the monitoring controller 244 transmits to all ONUs 300 a notification of the recovery from the protection (backup) line to the working (primary) line (10G) (S613). Furthermore, the monitoring controller 244 transmits a setting instruction to the switch unit 242 and the shaper unit 243 of OLT 200 (S605), the switch unit 242 selects the 10G line (S608) and the shaper unit changes the reference destination to the 10G downstream band information table 2010-10 (S608).

At each ONU 300 receiving the recovery notification from OLT 200, the monitoring controller 343 instructs the switch unit 342 to select the 10G line (S640 to S642), and the switch unit 342 selects the 10G-ONU unit 340 (S646 to S648). After the setting is completed, the recovery ACK from the 1G line to the 10G line is transmitted to OLT 200 (S643 to S645).

3. Flowchart

The operation of the PON system according to the embodiment will be briefly described with reference to FIG. 10.

Figure 10:
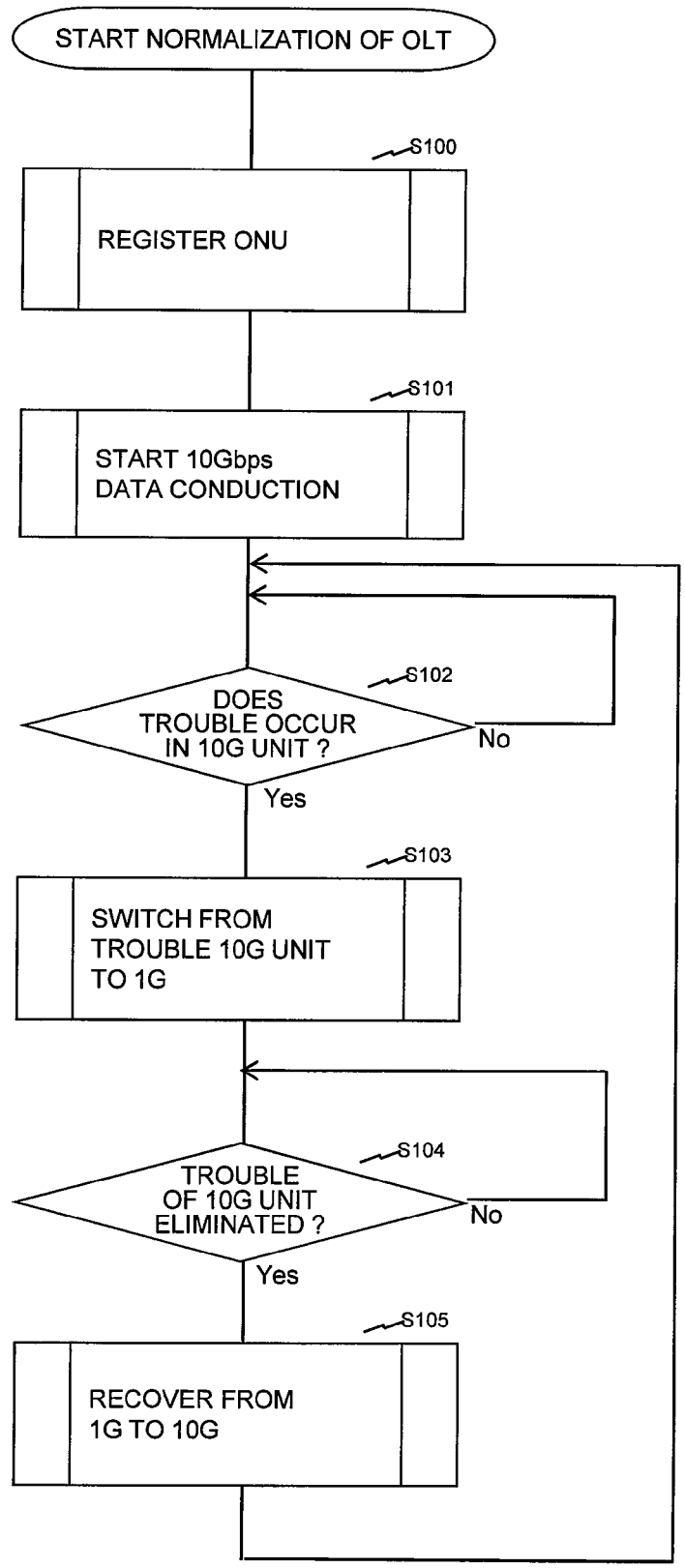
FIG. 10 is a flowchart showing the basic operation of a PON system having a protection (backup) line according to the embodiment.

Here, FIG. 10 is a flowchart showing the basic operation of the PON system. In FIG. 10, the monitoring controller 244 of OLT 200 registers ONU 300 connected to OLT 200 (S100). Then, the up/down 10 Gbps data conduction is started (S101). Here, when a trouble occurs in the 10G-OLT unit 240 of the PON system (S102: YES), OLT 200 switches the 10G-OLT unit 240 to the 1G-OLT unit 241, and also instructs ONU 300 so that the 10G-ONU unit 340 in which the trouble occurs is switched to the 1G-ONU unit 341 (S103). When the trouble of the 10G-OLT unit 240 is eliminated (S104:YES), OLT 200 recovers the 1G-OLT unit 241 to the 10G-OLT unit 240, and also instructs ONU 300 to perform re-switching from the 1G-ONU unit 340 to the 10G-ONU unit 341 (S105).

The operation of the ONU registration in OLT will be described in detail with reference to FIG. 11.

Figure 11:
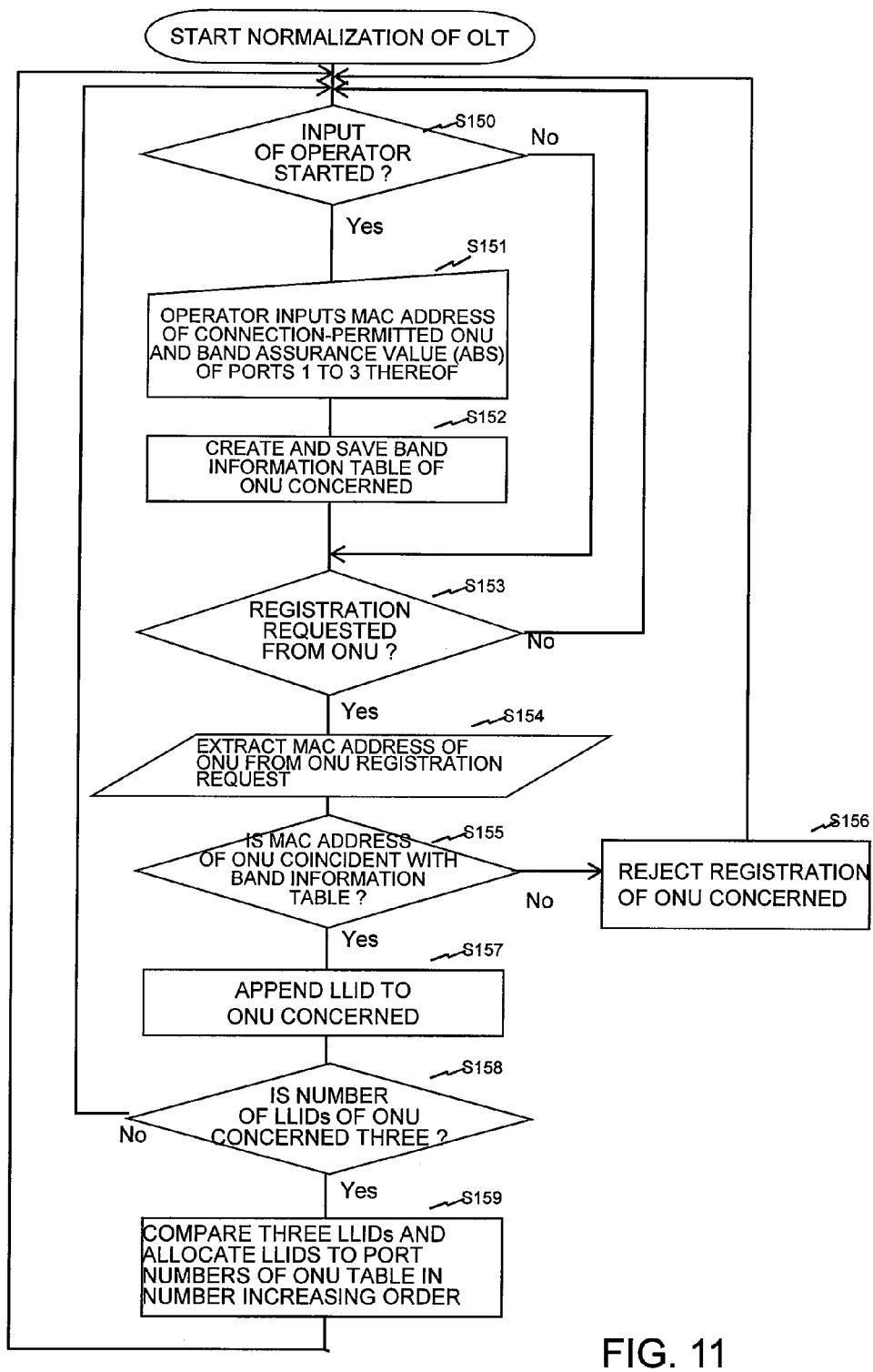
FIG. 11 is a flowchart of OLT for setting a band in advance by an operator according to the embodiment and allocating plural LLIDs to ONU.

Here, FIG. 11 is a flowchart showing the operation of registering ONU 300 in OLT 200. In FIG. 11, when OLT 200 starts normally and the operator starts to input (S150: YES), the operator inputs to OLT 200 the MAC address of ONU 300 to which connection is permitted and the band assurance value ASB at each port #1 to 3 (S151), and OLT 200 creates and saves the band information table corresponding to the input ONU 300 (S152). For example, the monitoring controller 244 registers the MAC address into the registered ONU information table 2000, and registers ASB into the 10G downstream band information table 2010-10 and the 1G downstream band information table 2010-1, and the 10G upstream band information table 2020-10 and the 1G upstream band information table 2020-1.

Subsequently, when OLT 200 detects the registration request from ONU 300 (S153), OLT 200 receives an ONU registration request signal, and extracts the MAC address of ONU 300 from the ONU registration request signal (S154). When the content thereof is coincident with the MAC address which has been input by the operator and registered in the registered ONU information table 2000 (S155:YES), LLID is appended to the ONU concerned (S157). When these MAC addresses are not coincident with each other (S155: NO), the registration of the ONU concerned is rejected (S156).

In this embodiment, a case where each table contains three LLIDs will be described as an example, however, the number of the LLIDs may be properly determined. When the accumulative total number of LLIDs appended to the ONU concerned reaches three (S158: YES), the three LLIDs appended to the ONU concerned are compared with one another, and they are allocated to the port numbers of the downstream band information table 2010 (the 10G downstream band information table 2010-10 or the 1G downstream band information table 2010-1 or both the tables 2010-10 and 2010-1, the same as above is applied below) and the upstream band information table 2020 (the 10G upstream band information table 2020-1, or the 1G upstream band information table 2020-1 or both the tables 2020-10 and 2020-1, the same as above is applied below) in the number increasing order (S159). Here, at ONU 300, the monitoring controller 343 likewise allocates the LLIDs to the port numbers in the number increasing order, whereby the combination of the port number and LLID is coincident between OLT and ONU. In this embodiment, it is predetermined that data at the largest port number is applied to data of the lowest priority type (that is, the third port number has the lowest priority).

The operation of the downstream band information table at OLT will be described with reference to FIG. 12.

Figure 12:
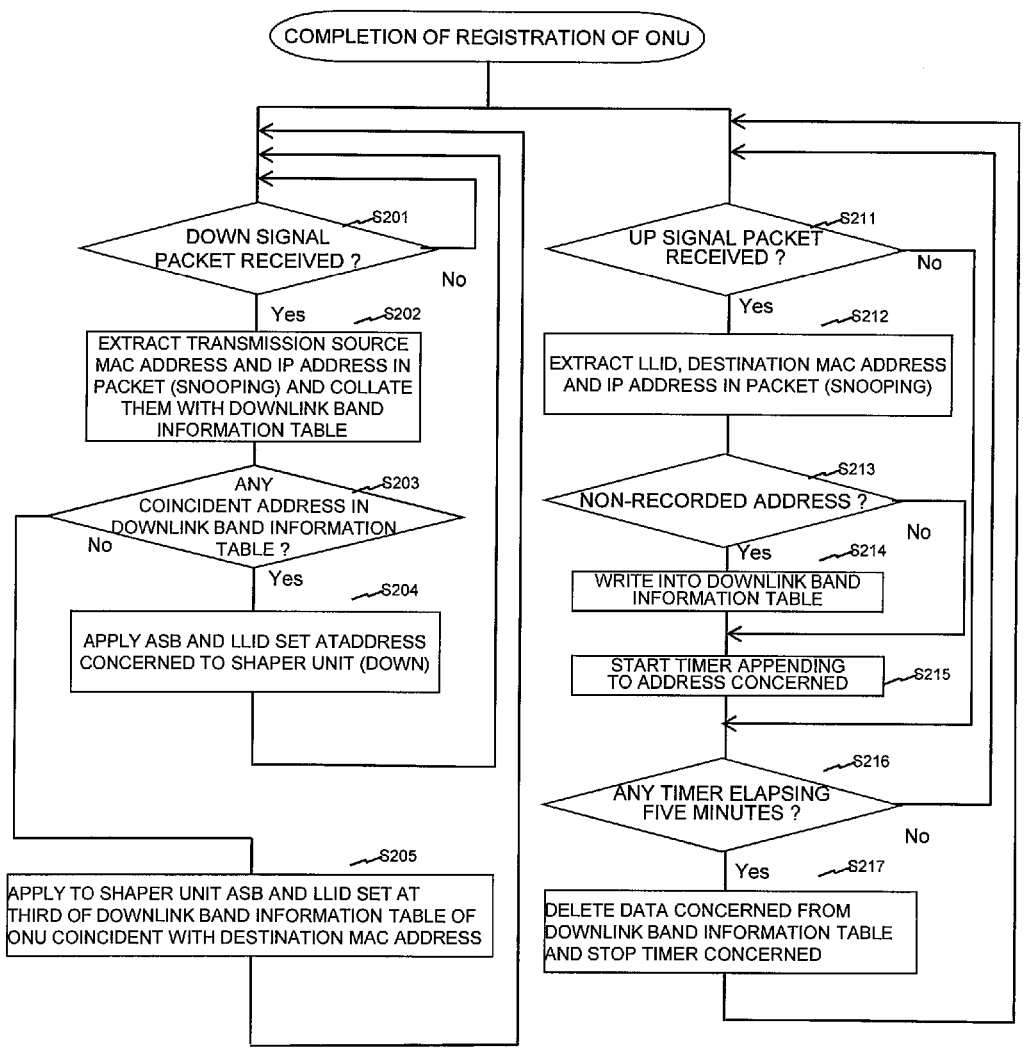
FIG. 12 is a flowchart for updating a band information table according to the embodiment.

Here, FIG. 12 is a flowchart of the updating operation of the downstream band information table at OLT 200. In FIG. 12, a right half portion corresponds to an operation of extracting information from an upstream signal, and a left half portion corresponds to an operation of collating information with respect to a downstream signal.

First, the right half portion will be described.

When OLT 200 receives an upstream signal packet (S211: YES), the 10G-OLT unit 240 or the 1G-OLT unit 241 extracts LLID, the destination MAC address and the destination IP address in the packet (Snooping) (S212). Subsequently, when these addresses have not yet been recorded in the downstream band information table 2010 (S213: YES), the monitoring controller 244 of OLT 200 writes these addresses on a line coincident with LLID extracted from the packet in the downstream band information table 2010 (S214), and starts a timer (S215). Here, for example when LLID, the destination MAC address and the destination IP address extracted by the 10G-OLT unit 240 have not yet been recorded in the 10G downstream band information table 2010-10, these addresses are recorded in both the 10G downstream band information table 2010-10 and the 1G downstream band information table 2010-1. Likewise, when LLID, the destination MAC address and the destination IP address extracted by the 1G-OLT unit 241 have not yet been recorded in the 1G downstream band information table 2010-1, these addresses are recorded in both the 10G downstream band information table 2010-10 and the 1G downstream band information table 2010-1. Alternatively, when the data extracted by the 10G-OLT unit 240 have not yet been recorded in the 10G downstream band information table 2010-10, the data may be recorded in only the 10G downstream band information table 2010-10, or when the data extracted by the 1G-OLT unit 241 have not yet been recorded in the 1G downstream band information table 2010-1, the data may be recorded in only the 1G downstream band information table 2010-1. When there is an address at which the timer elapses a predetermined time (for example, five minutes) (S216: YES), the monitoring controller 244 deletes the address concerned from the downstream band information table 2010, and stops the timer concerned (S217). When the extracted address has been recorded on the line coincident with LLID extracted from the packet (S213: NO), the monitoring controller 244 re-starts the timer attendant to the address concerned (S215: NO), and extends the time until the data concerned is deleted from the downstream band information table 2010.

Next, the left half portion will be described. When OLT 200 receives a downstream signal packet (S201: YES), the monitoring controller 244 extracts the transmission source MAC address and the transmission source IP address in the packet (Snooping), and collates them with the content of the downstream band information table 2010 (S202). This is because it is checked whether the packet is data transmitted from the MAC address or the IP address specified as a designation of the upstream signal, and in this case OLT 200 appends the corresponding LLID to the packet and applies the corresponding ASB.

Therefore, when there is an address coincident with the transmission source MAC address or the transmission source IP address extracted from the downstream signal (S203: YES), the monitoring controller 244 sets to the shaper unit 243 of OLT 200 ASB and LLID which are set at the corresponding address in the downstream band information table 2010, and applies them to the downstream signal (S204). When the downstream band information table 2010 does not have any address which is coincident with the address extracted from the downstream signal (S203: NO), the monitoring controller 244 applies to the shaper unit 243 ASB and LLID which are set at the last port (for example, third port) of the downstream band information table 2010 which refers to the ONU 300 concerned (S205). In this embodiment, as an example, the set value at the third port concerned is predetermined to be applied to data whose type has the lowest priority, and thus it is applied to these data for convenience's sake.

The operation when a trouble occurs in the working (primary) line (10 Gbps) will be described with reference to FIG. 13.

Figure 13:
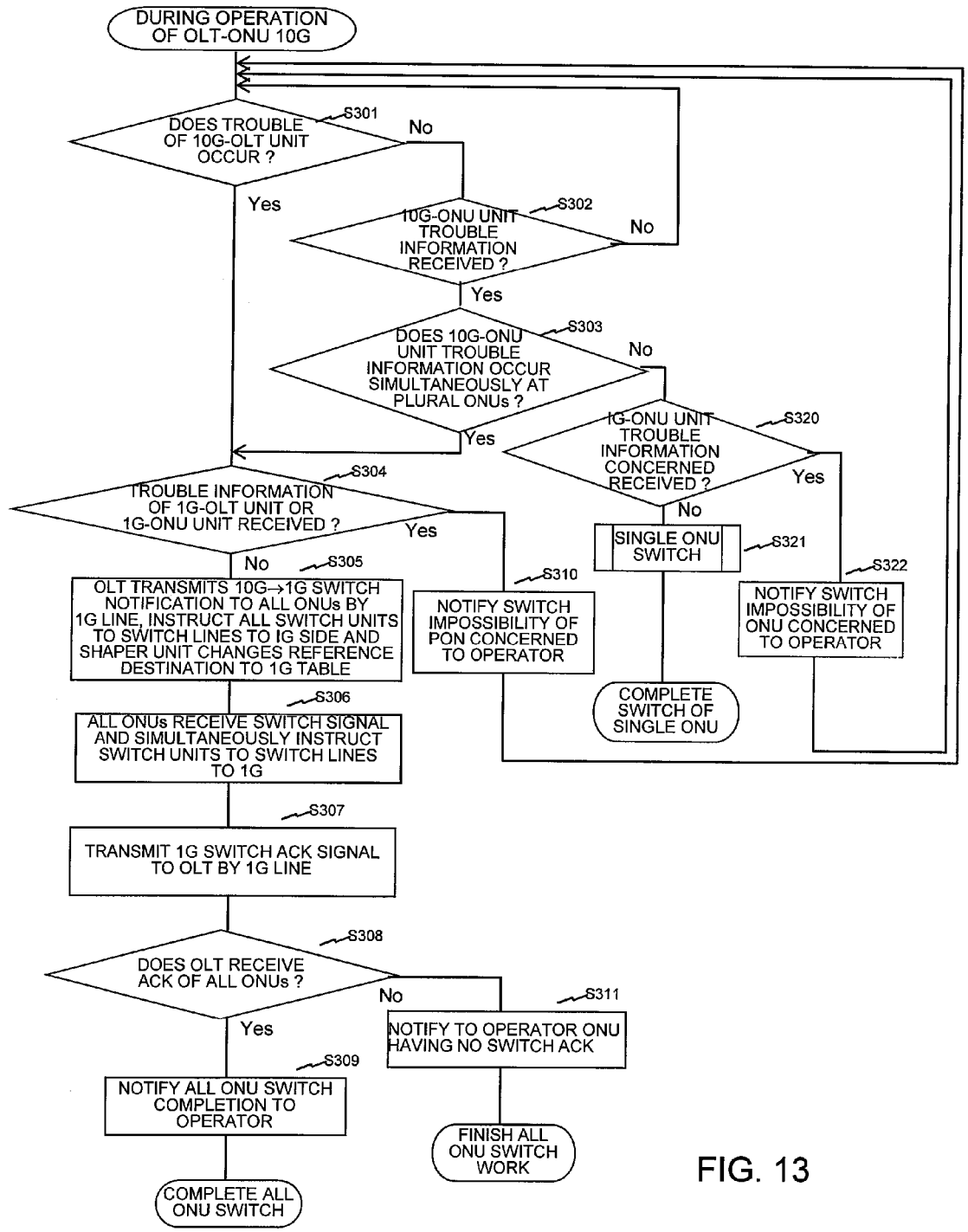
FIG. 13 is a flowchart when a trouble occurs in 10G portion of OLT or plural ONUs and thus OLT and ONU of all portions are switched to 1G portion according to the embodiment.

Here, FIG. 13 is a flowchart showing the operation when a trouble occurs in the 10G unit during operation of the working (primary) line. In FIG. 13, in a case where the monitoring controller 244 of OLT 200 detects that a trouble occurs in the 10G-OLT unit 240 during operation of OLT 200 and ONU 300 at 10 Gbps (S301: YES), the monitoring controller 244 of OLT 200 checks whether no trouble occurs in the 1G-OLT unit 241 and the 1G-ONU unit 341 (S304). For example, the monitoring controller 244 can check any trouble on the basis of a monitoring signal from a connection line to the 1G-OLT unit 241 or on the basis of no reception of ONU trouble notification or the like. Here, when a trouble occurs in the 1G-OLT unit or the 1G-ONU unit (S304: YES), it is determined that switching of the PON concerned is impossible, and the monitoring controller notifies it to the operator (S310). When no trouble occurs in the 1G-OLT unit and the 1G-ONU unit (S304: NO), OLT 200 transmits a notification of the switching from 10G to 1G to all ONUs 300 by using the 1G line. Simultaneously, OLT 200 controls the switch unit 242 to switch all the lines to the 1G-OLT unit 241 side as the protection (backup) line, and changes the reference destination of the shaper unit 243 to the 1G downstream band information table 2010-1 (S305). Subsequently, when the monitoring controller 343 of ONU 300 receives the switch signal from OLT 200, the monitoring controller 343 controls the switch unit 342 to switch to the 1G-ONU unit 341 side as the protection (backup) line (S306). Then, when the switch to the 1G line is completed, each ONU 300 transmits a switch ACK signal to OLT 200 (S307). When the monitoring controller 244 of OLT 200 confirms reception of the switch ACK signal from all ONUs 300 (S308: YES), the monitoring controller 244 notifies all ONU switch completion to the operator (S309). When no switch ACK signal is received from some ONUs (S308: NO), the monitoring controller 244 notifies the information of the ONUs 300 concerned to the operator (S311).

Furthermore, when no trouble occurs in the 10G-OLT unit 240 (S301: NO), OLT 200 receives the trouble information (ONU trouble notification) of the 10G-ONU unit 340 (S302: YES). In this case, when the trouble information of the 10G-ONU unit occurs in plural ONUs at the same time (S303: YES), the monitoring controller 244 of OLT 200 regards the same trouble as the 10G-OLT unit, and switches the whole PON system concerned to 1G.

Furthermore, when the monitoring controller 244 of OLT 200 detects on the basis of the ONU trouble notification from single ONU 300 that a trouble occurs in the single 10G-ONU unit 340 (S303: NO), the monitoring controller 244 of OLT 200 checks whether no trouble occurs in the 1G-ONU unit 341 of the ONU 300 concerned (S320). The monitoring controller 244 can check this on the basis of no reception of the ONU trouble notification representing a trouble of the 1G unit or the like, for example. When a trouble occurs in the 1G-ONU unit concerned (S320: YES), the monitoring controller 244 of OLT 200 determines that switching of the ONU concerned is impossible, and thus notifies the information of the ONU concerned to the operator (S322). When no trouble occurs in the 1G-ONU unit concerned (S320: NO), the monitoring controller 244 of OLT 200 transmits a setting instruction of the single ONU (S321). The switching operation of the single ONU will be described with reference to FIG. 14.

The operation of switching the line of the single ONU from the working (primary) line to the protection (backup) line will be described with reference to FIG. 14.

Figure 14:
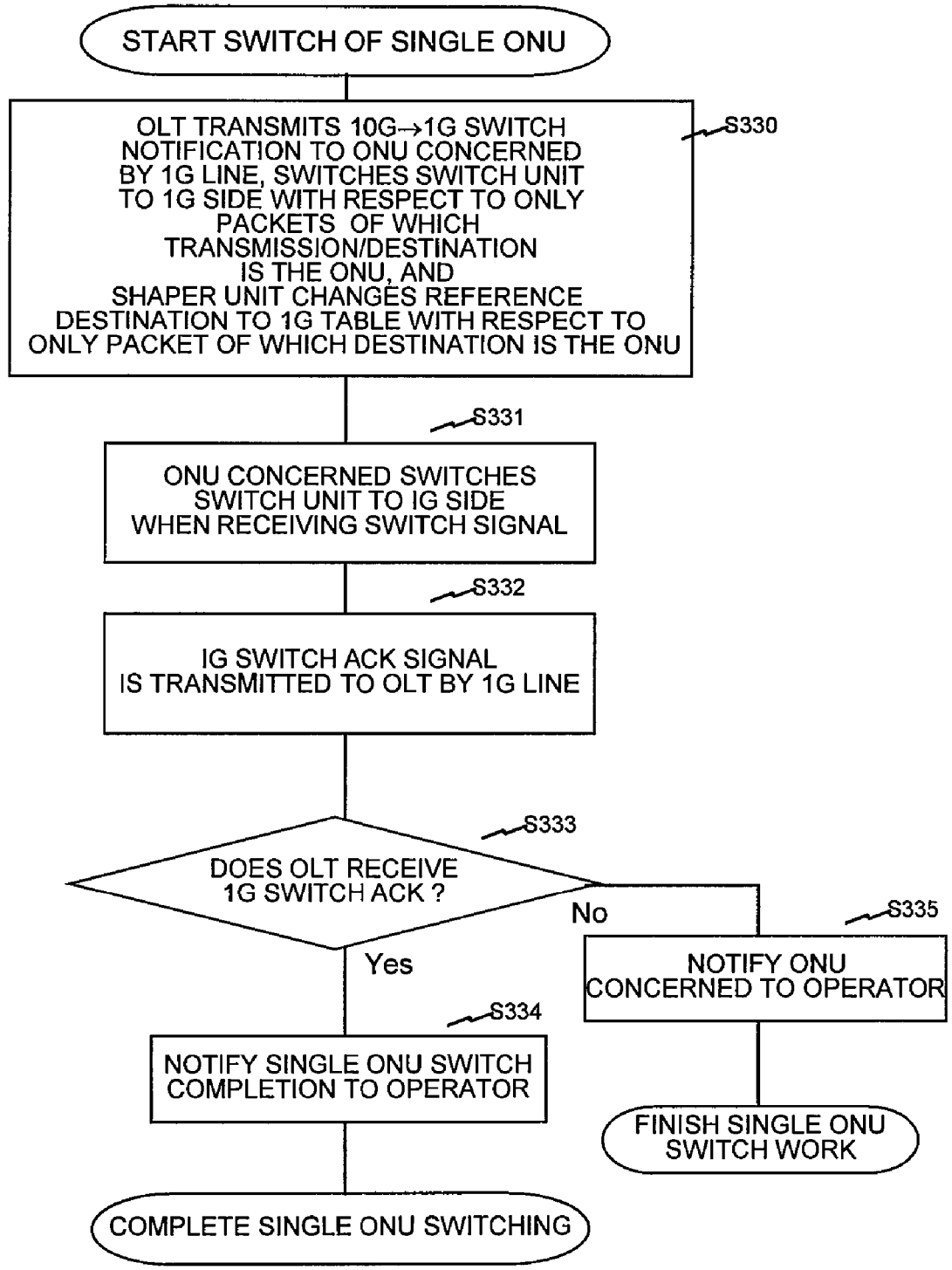
FIG. 14 is a flowchart when a trouble occurs in 10G portion of ONU as a single unit and thus the ONU concerned and OLT are switched to 1G portion.

Here, FIG. 14 is a flowchart showing the operation of switching the single line of ONU 300 from the working (primary) line to the protection (backup) line. In FIG. 14, when OLT 200 switches the single ONU 300 from the working (primary) line (10 Gbps) to the protection (backup) line (1 Gbps), the monitoring controller 244 of OLT 200 transmits a notification of the switch from 10G to 1G to the ONU concerned by using the 1G line, switches the switch unit 242 of OLT 200 to the 1G-OLT unit 241 side with respect to only the packet transmitted from the ONU 300 concerned and the packet addressed to the ONU 300 concerned, and also changes the reference destination of the shaper unit 243 to the 1G downstream band information table 2010-1 with respect to only the packet addressed to the ONU 300 concerned (S330). Subsequently, when receiving the switch signal from OLT 200, the monitoring controller 343 of the ONU 300 concerned switches the switch unit 342 to the 1G-ONU unit 341 side (S331). Then, the ONU 300 concerned transmits a 1G switch ACK signal representing completion of 1G switching to OLT 200 by using the 1G line (S332).

When receiving the 1G switch ACK signal from the ONU 300 concerned (S333: YES), the monitoring controller 244 of OLT 200 notifies the switching completion of the protection (backup) line of the single ONU to the operator (S334). When the monitoring controller 244 of OLT 200 does not receive any 1G switch ACK signal from the ONU 300 concerned (S333: NO), it notifies the information of the ONU 300 concerned to the operator (S335).

The operation when the working (primary) line is recovered from the trouble will be described with reference to FIG. 15.

Figure 15:
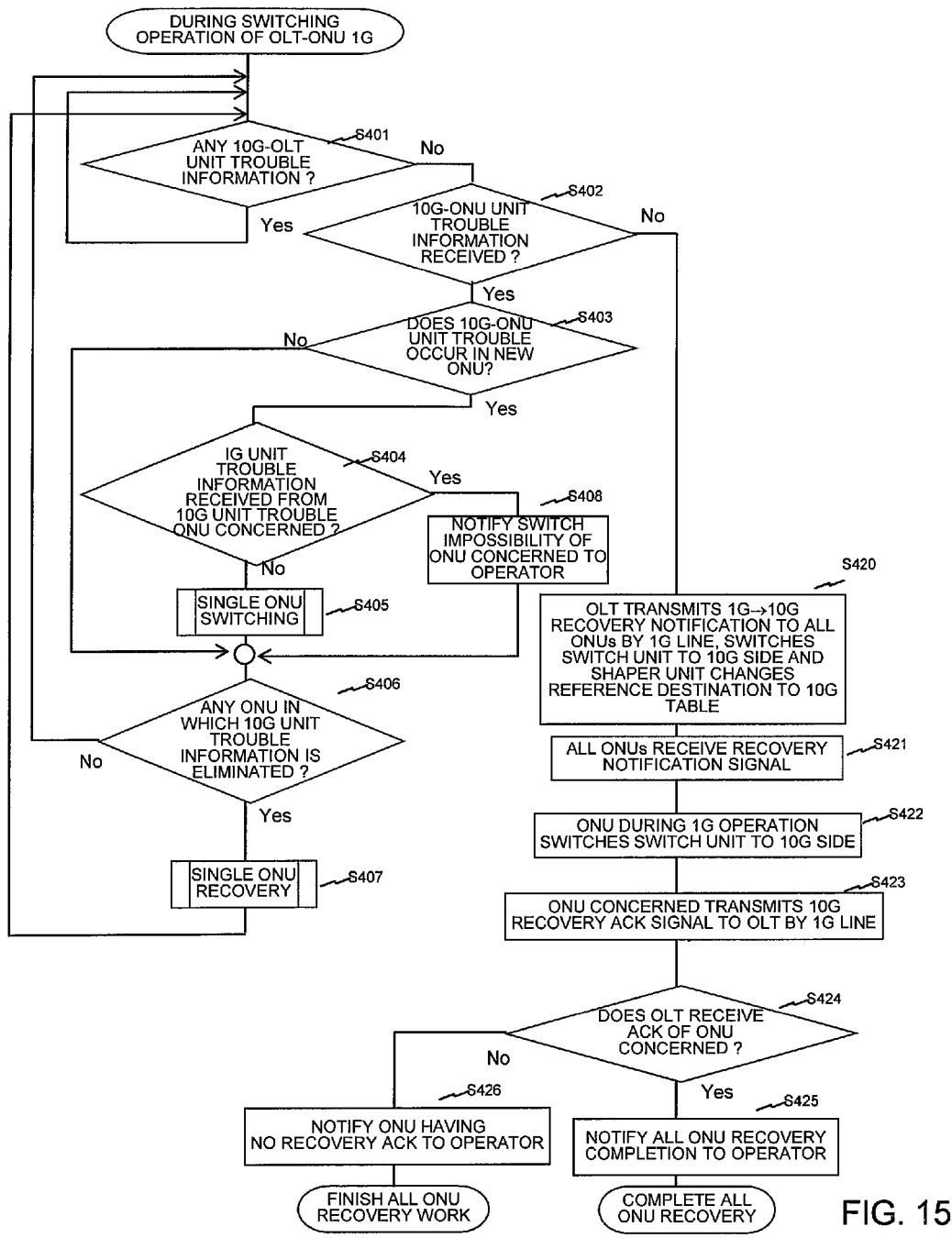
FIG. 15 is a flowchart when OLT and ONU of all portions are restored to 10G portion according to the embodiment.

Here, FIG. 15 is a flowchart showing the operation when the working (primary) line is recovered from the trouble. In FIG. 15, under a condition that a trouble has already occurred in the 10G unit (10G-OLT unit or the 10G-ONU unit) and thus the PON system is operated while the 10G unit is switched to the 1G unit, when the monitoring controller 244 of OLT 200 detects that the trouble has been already eliminated in the 10G-OLT unit 240 (S401: NO), the monitoring controller 244 of OLT 200 checks whether the 10G-ONU unit 340 has no trouble (S402). For example, the monitoring controller 244 can detect and check the trouble on the basis of a monitoring signal transmitted from the 10G-OLT unit 240 through a connection line or on the basis of no reception of an ONU trouble notification or the like.

In a case where the 10G-ONU unit 340 has a trouble (S402: YES), when the monitoring controller 244 of OLT 200 detects on the basis of an ONU trouble notification representing a trouble of the 10G unit that a trouble occurs in the 10G-ONU unit 340 of new ONU 300 (S403: YES), the monitoring controller 244 of OLT 200 makes an instruction of switching from the working (primary) line of the single ONU to the protection (backup) line thereof (S405) insofar as the 1G-ONU unit 341 of the ONU 300 concerned has no trouble information (no ONU trouble notification representing the trouble of the 1G unit) (S404: NO). The details of the switching operation are shown in FIG. 14. When a trouble also occurs in the 1G-ONU unit 341 of the ONU 300 concerned (S404: YES), the monitoring controller 244 of OLT 200 notifies the information on impossibility of switching of the ONU concerned to the operator (S408).

In a case where the 10G-ONU unit 340 has a trouble (S402: YES), when the monitoring controller 244 of OLT 200 detects on the basis of the reception of a recovery notification from ONU or the like that there is ONU in which the 10G unit trouble (information) has been eliminated since the previous check (S406: YES), the monitoring controller 244 determines that the single ONU has been recovered, and makes a single ONU recovery instruction (S407). The operation of recovering the single ONU is shown in FIG. 16.

In a case where the 10G-ONU units 340 of all ONUs have no trouble (S402: NO), the monitoring controller 244 of OLT 200 determines that the trouble of the 10G unit is eliminated in the PON concerned, and transmits a recovery notification from the 1G line to the 10G line to all ONUS 300 by using the 1G line. At the same time, the monitoring controller 244 switches the switch unit 242 of OLT 200 to the 10G-OLT unit 240, and changes the reference destination of the shaper unit 243 to the 10G downstream band information table 2010-10 (S420). When receiving the recovery notification signal from OLT 200 (S421), with respect to ONUs 300 which operate by using the 1G-ONU units 341, the monitoring controller 343 switches the switch unit 342 to the 10G-ONU unit 340 side (S422), and transmits the 10G recovery ACK signal to OLT by using the 1G line (S423). Here, when receiving the ACK signal concerned from the ONU 300 concerned (S424: YES), the monitoring controller 244 of OLT 200 notifies the recovery completion of all ONUs to the operator (S425). When there is recovery target ONU from which the monitoring controller 244 of OLT 200 does not receive any ACK signal (S424: NO), the ONU 300 concerned from which no recovery ACK signal has not been received is notified to the operator (S426).

The operation of recovering the single ONU from the protection (backup) line to the working (primary) line will be described with reference to FIG. 16.

Figure 16:
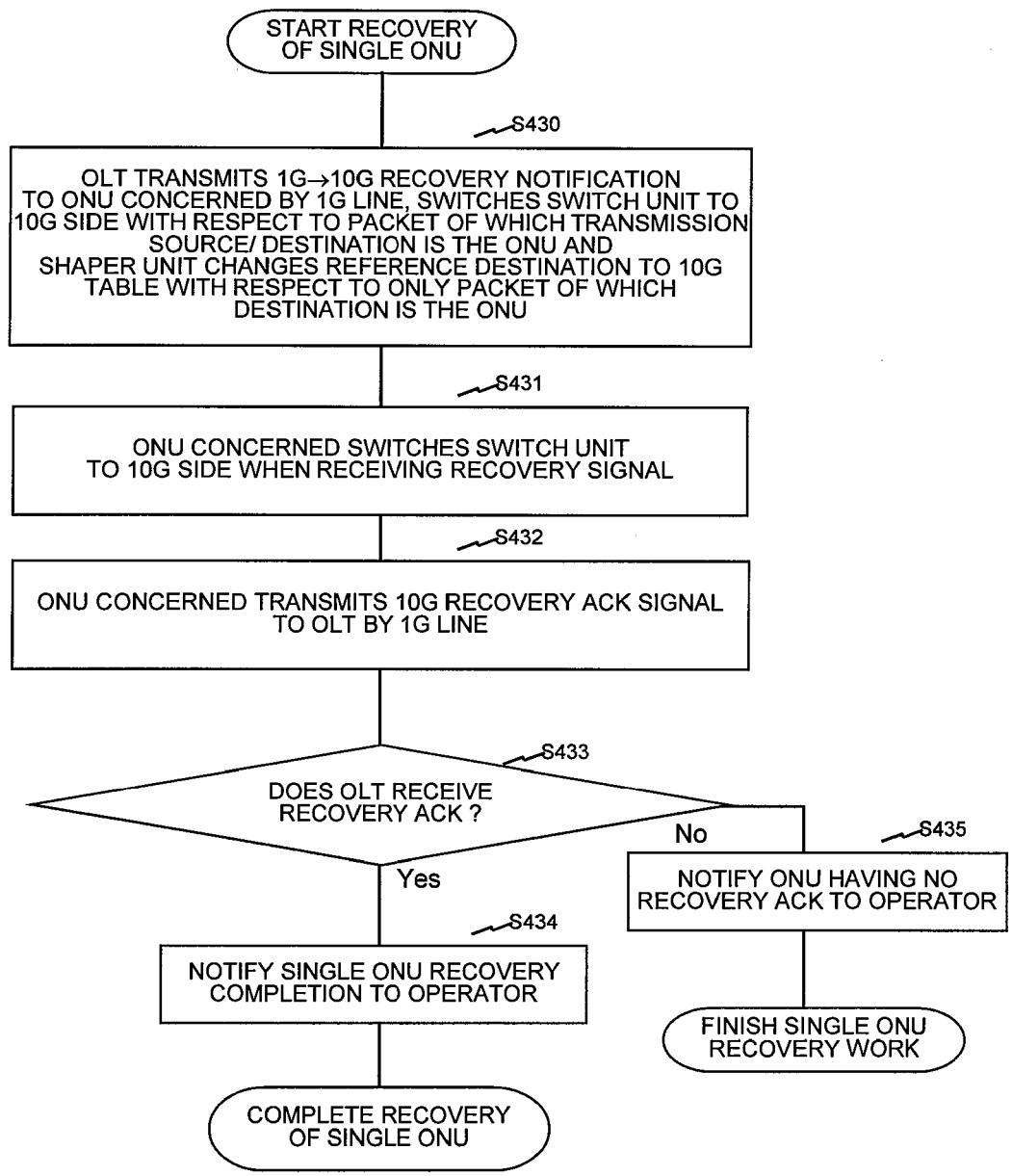
FIG. 16 is a flowchart when ONU as a single unit and OLT are restored to 10G portion according to the embodiment.

Here, FIG. 16 is a flowchart showing the operation of recovering the single ONU 300 from the protection (backup) line to the working (primary) line. In FIG. 16, when the monitoring controller 244 of OLT 200 determines that it is possible to recover the single ONU 300, the monitoring controller 244 transmits the notification of the recovery from the 1G line to the 10G line to the ONU 300 concerned by using the 1G line, and simultaneously switches the switch unit 242 to the 10G-OLT unit 240 side with respect to only a packet whose transmission source is the ONU 300 concerned and a packet whose transmission destination is the ONU 300. Furthermore, the monitoring controller 244 changes the reference destination of the shaper unit 243 to the 10G downstream band information table 2010-10 with respect to only a packet whose transmission destination is the ONU 300 concerned (S430).

Subsequently, when the ONU 300 concerned receives the recovery notification signal, the monitoring controller 343 switches the switch unit 342 to the 10G-ONU unit 340 side (S431), and then transmits the 10G recovery ACK signal to OLT 200 by using the 1G line (S432).

Here, when receiving the recovery ACK (S433: YES), the monitoring controller 244 of OLT 200 notifies the completion of the recovery of the single ONU 300 to the operator (S434). When the monitoring controller 244 of OLT 200 does not receive any ACK from the ONU 300 concerned (S433: NO), it notifies the information of the ONU 300 concerned to the operator (S435).

4. Other Embodiments

As another embodiment, a line such as 1G line based on a general PON system which has been introduced to users may be diverted and used as a protection (backup) line. That is, this embodiment is implemented by diverting an existing apparatus while the 1G-OLT unit 241 and the 1G-ONU unit 341 in OLT 200 and ONU 300 according to the above-described embodiment are regarded as external units, designing the other units and then connecting these units to one another.

Furthermore, as another embodiment, the above-described embodiment is equipped with a function of independently ON/OFF-controlling respective power sources of the 10G-OLT unit and the 10G-ONU unit having relatively large power consumption, and also a function of forcedly switching the working (primary) line to the protection (backup) line even when the working (primary) line has no trouble. Furthermore, the respective roles of the working (primary) line and the protection (backup) line are reversed in a time zone in which communication demand is low (or at a predetermined time, under a predetermined condition or manually) (working (primary) line: 1 Gbps, protection (backup) line: 10 Gbps). In this case, the 1G unit is operated as the working (primary) line, and the 10G unit is powered off, thereby implementing a PON system which is further reduced in power consumption.

The present invention is applicable to various passive optical network systems. The transmission speed is not limited to those of 10G and 1G, and various proper transmission speeds may be used. Furthermore, LLID is described as an example of ID, however, other proper identifiers may be used.

What is claimed is:

1. A passive optical network system having optical network units (ONU) and an optical line terminal (OLT) that are mutually connected to one another through optical fibers,
   the ONU comprising:
      a high-speed ONU unit that executes ONU communication processing containing separating processing of a downstream signal packet and assembling processing of an upstream signal packet, and transmits an optical frame at a first transmission speed; and,
      a low-speed ONU unit that executes the ONU communication processing, and transmits an optical frame at a second transmission speed lower than the first transmission speed;
   and
   the OLT comprising:
      a shaper unit that receives data from a network and adjusts a flow rate of a data signal;
      a high-speed OLT unit that executes OLT communication processing containing extraction processing of extracting a destination address and a link identifier of each terminal connected to the ONU from the upstream signal packet and assembling processing of a downstream signal packet, and transmits an optical frame at the first transmission speed;
      a low-speed OLT unit that executes the OLT communication processing and transmits an optical frame at the second transmission speed lower than the first transmission speed;
      an OLT switch unit that is connected to the shaper unit and switches the high-speed OLT unit or the low-speed OLT unit;
      a registered ONU information table that stores addresses of the high-speed ONU unit and the low-speed ONU unit with respect to each ONU;
      a high-speed downstream band information table that stores a destination address extracted from the upstream signal packet from the ONU and a band assurance value (ASB) of the downstream signal, in association with a link identifier with respect to each ONU;
      a low-speed downstream band information table that stores a destination address extracted from the upstream signal packet from the ONU and ASB of a downstream signal having a lower value than the high-speed downstream band information table, in association with a link identifier different from the high-speed downstream band information table with respect to each ONU; and
      an OLT monitoring controller that writes data into the high-speed downstream band information table or the low-speed downstream band information table or reads out data therefrom, specifies a flow rate of data to the shaper unit and switches the switch unit;
   wherein
      the high-speed OLT unit and the low-speed OLT unit extract a link identifier and a destination address in the upstream signal packet received from the ONU, and
      when the destination address is not recorded in the high-speed lower band information table or the low-speed downstream band information table, the OLT monitoring controller writes the destination address on a line coincident with the link identifier extracted from the upstream signal packet in the high-speed downstream band information table and/or the low-speed downstream band information table;
      when the OLT receives a downstream signal packet from a network, the OLT monitoring controller extracts a transmission source address in the downstream signal packet, and checks the transmission source address with a destination address stored in the high-speed downstream band information table or the low-speed downstream band information table under operation,
      when a destination address coincident with the transmission source address extracted from the downstream signal packet is stored, the OLT monitoring controller sets to the shaper unit ASB and a link identifier set in the address in the high-speed downstream band information table or the low-speed downstream band information table under operation, the shaper unit processes the downstream signal packet, and
      when an address coincident with the transmission source address extracted from the downstream signal is not stored in the high-speed downstream band information table or the low-speed downstream band information table under operation, the OLT monitoring controller applies to the shaper unit ASB and a link identifier predetermined and set to data whose type is low in priority in the high-speed downstream band information table or the low-speed downstream band information table under operation, the shaper unit processes the downstream signal packet; and
      in a case where the OLT monitoring controller detects that a trouble occurs in the high-speed OLT unit during operation of the OLT and the ONU at the first transmission speed, when the OLT monitoring controller confirms that no trouble occurs in the low-speed OLT unit and the low-speed ONU unit of the ONU, the OLT transmits a switch notification from the first transmission speed to the second transmission speed to plural ONUs connected to the OLT by using a line of the second transmission speed, and
      the OLT monitoring controller controls the OLT switch unit to switch the plural ONUs and plural lines connected to the respective ONUs to the low-speed OLT unit side, and changes ASB of the shaper unit so that the low-speed downstream band information table is applied.

2. The passive optical network system according to claim 1, the ONU further comprising:
an ONU switch unit that selects the high-speed ONU unit or the low-speed ONU unit and switches the selected unit to any terminal; and
an ONU monitoring controller that is connected to the high-speed ONU unit and the low-speed ONU unit and controls switching of the ONU switch unit; wherein,
when the ONU monitoring controller receives from the OLT a notification of the switch from the first transmission speed to the second transmission speed, the ONU monitoring controller controls the ONU switch unit so that the ONU switch unit is switched to the low-speed ONU unit side, and transmits a acknowledge signal to the OLT.

3. The passive optical network system according to claim 1, wherein, in a case where no trouble occurs in the high-speed OLT unit during operation of the OLT and the ONU at the first transmission speed, when the OLT receives trouble information of the high-speed ONU unit from the plural ONUs, the OLT monitoring controller of the OLT switches the operation of the OLT and the ONU to an operation at the second transmission speed.

4. The passive optical network system according to claim 1, wherein
in a case where the OLT monitoring controller receives a trouble notification of the high-speed ONU unit from a single ONU during operation of the OLT and the ONU at the first transmission speed, when the low-speed ONU unit of the ONU has no trouble, the OLT monitoring controller transmits a notification of the switch from the first transmission speed to the second transmission speed to the ONU by using a line of the second transmission;
the OLT monitoring controller switches the OLT switch unit of the OLT to the low-speed OLT unit side with respect to a packet transmitted from the ONU and a packet addressed to the ONU, and changes ASB of the shaper unit so that the low-speed downstream band information table is applied to only a packet addressed to the ONU; and
when receiving a switch notification from the OLT, the ONU monitoring controller of the ONU switches the ONU switch unit to the low-speed ONU unit side, and transmits to the OLT a switch acknowledge signal representing completion of switching by using a line of the second transmission speed.

5. The passive optical network system according to claim 1, wherein,
when a predetermined time elapses since a destination address is stored in the high-speed downstream band information table or the low-speed downstream band information table, the OLT monitoring controller deletes the destination address from the high-speed downstream band information table or the low-speed downstream band information table, and
when a destination address extracted from the upstream signal packet has been recorded on a line coincident with a link identifier extracted from the upstream signal packet, the OLT monitoring controller clears the predetermined time lapse corresponding to the destination address.

6. The passive optical network system according to claim 1, wherein, in a case where the OLT monitoring controller detects that a trouble is eliminated in the high-speed OLT unit, under a condition that the trouble occurs in the high-speed OLT unit and thus the high-speed OLT unit is switched to the low-speed OLT unit, upon reception of a trouble notification of the high-speed ONU unit from a single ONU unit, the OLT monitoring controller instructs the ONU to switch from the first transmission speed to the second transmission speed when the low-speed ONU unit of the ONU has no trouble information, and
when receiving a notification of recovery of the high-speed ONU unit from the single ONU, the OLT monitoring controller instructs the ONU to recover to the first transmission speed.

7. The passive optical network system according to claim 6, wherein,
when no trouble occurs in the high-speed ONU units of plural connected ONUs, the OLT monitoring controller transmits a notification of recovery from the second transmission speed to the first transmission speed to the plural connected ONUs by using a line of the second transmission speed, switches the OLT switch unit to the high-speed OLT unit, and changes to refer of ASB of the shaper unit to the high-speed downstream band information table, and
when receiving the recovery notification from the OLT, in some of the plural connected ONUs which are operated with the low-speed ONU units, the ONU monitoring controller switches the ONU switch unit to the high-speed ONU unit side, and transmits a recovery acknowledge signal to the OLT by using the line of the second transmission speed.

8. The passive optical network system according to claim 1, wherein the low-speed OLT unit and the low-speed ONU unit are designed as external devices.

9. The passive optical network system according to claim 1, further comprising a power source with which the high-speed OLT unit and the high-speed ONU unit are subjected to ON/OFF control, wherein the high-speed OLT unit and the high-speed ONU unit are OFF-controlled at a predetermined time, under a predetermined condition or manually, and a switching operation is performed so that the passive optical network system is operated with the low-speed OLT unit and the low-speed ONU unit.

10. An optical line terminal (OLT) in a passive optical network system having an optical network units (ONU) and an optical line terminal (OLT) that are mutually connected to one another through optical fibers, wherein the ONU comprising: a high-speed ONU unit that executes ONU communication processing containing separating processing of a downstream signal packet and assembling processing of an upstream signal packet, and transmits an optical frame at a first transmission speed; and, a low-speed ONU unit that executes the ONU communication processing, and transmits an optical frame at a second transmission speed lower than the first transmission speed,
the optical line terminal (OLT) comprising:
a shaper unit that receives data from a network and adjusts a flow rate of a data signal;
a high-speed OLT unit that executes OLT communication processing containing extraction processing of extracting a destination address and a link identifier of each terminal connected to the ONU from the upstream signal packet and assembling processing of a downstream signal packet, and transmits an optical frame at the first transmission speed;
a low-speed OLT unit that executes the OLT communication processing and transmits an optical frame at the second transmission speed lower than the first transmission speed;

an OLT switch unit that is connected to the shaper unit and switches the high-speed OLT unit or the low-speed OLT unit;

a registered ONU information table that stores addresses of the high-speed ONU unit and the low-speed ONU unit with respect to each ONU;

a high-speed downstream band information table that stores a destination address extracted from the upstream signal packet from the ONU and a band assurance value (ASB) of the downstream signal, in association with a link identifier with respect to each ONU;

a low-speed downstream band information table that stores a destination address extracted from the upstream signal packet from the ONU and ASB of a downstream signal having a lower value than the high-speed downstream band information table, in association with a link identifier different from the high-speed downstream band information table with respect to each ONU; and an OLT monitoring controller that writes data into the high-speed downstream band information table or the low-speed downstream band information table or reads out data therefrom, specifies a flow rate of data to the shaper unit and switches the switch unit;

wherein the high-speed OLT unit and the low-speed OLT unit extract a link identifier and a destination address in the upstream signal packet received from the ONU, and when the destination address is not recorded in the high-speed lower band information table or the low-speed downstream band information table, the OLT monitoring controller writes the destination address on a line coincident with the link identifier extracted from the upstream signal packet in the high-speed downstream band information table and/or the low-speed downstream band information table;

when the OLT receives a downstream signal packet from a network, the OLT monitoring controller extracts a transmission source address in the downstream signal packet, and checks the transmission source address with a destination address stored in the high-speed downstream band information table or the low-speed downstream band information table under operation, when a destination address coincident with the transmission source address extracted from the downstream signal packet is stored, the OLT monitoring controller sets to the shaper unit ASB and a link identifier set in the address in the high-speed downstream band information table or the low-speed downstream band information table under operation, the shaper unit processes the downstream signal packet, and when an address coincident with the transmission source address extracted from the downstream signal is not stored in the high-speed downstream band information table or the low-speed downstream band information table under operation, the OLT monitoring controller applies to the shaper unit ASB and a link identifier predetermined and set to data whose type is low in priority in the high-speed downstream band information table or the low-speed downstream band information table under operation, the shaper unit processes the downstream signal packet; and in a case where the OLT monitoring controller detects that a trouble occurs in the high-speed OLT unit during operation of the OLT and the ONU at the first transmission speed, when the OLT monitoring controller confirms that no trouble occurs in the low-speed OLT unit and the low-speed ONU unit of the ONU, the OLT transmits a switch notification from the first transmission speed to the second transmission speed to plural ONUs connected to the OLT by using a line of the second transmission speed, and the OLT monitoring controller controls the OLT switch unit to switch the plural ONUs and plural lines connected to the respective ONUs to the low-speed OLT unit side, and changes ASB of the shaper unit so that the low-speed downstream band information table is applied.

11. The optical line terminal according to claim 10, wherein, in a case where no trouble occurs in the high-speed OLT unit during operation of the OLT and the ONU at the first transmission speed, when the OLT receives trouble information of the high-speed ONU unit from the plural ONUs, the OLT monitoring controller of the OLT switches the operation of the OLT and the ONU to an operation at the second transmission speed.

12. The optical line terminal according to claim 10, wherein in a case where the OLT monitoring controller receives a trouble notification of the high-speed ONU unit from a single ONU during operation of the OLT and the ONU at the first transmission speed, when the low-speed ONU unit of the ONU has no trouble, the OLT monitoring controller transmits a notification of the switch from the first transmission speed to the second transmission speed to the ONU by using a line of the second transmission;

the OLT monitoring controller switches the OLT switch unit of the OLT to the low-speed OLT unit side with respect to a packet transmitted from the ONU and a packet addressed to the ONU, and changes ASB of the shaper unit so that the low-speed downstream band information table is applied to only a packet addressed to the ONU; and when receiving a switch notification from the OLT, the ONU monitoring controller of the ONU switches the ONU switch unit to the low-speed ONU unit side, and transmits to the OLT a switch acknowledge signal representing completion of switching by using a line of the second transmission speed.

13. The optical line terminal according to claim 10, wherein, when a predetermined time elapses since a destination address is stored in the high-speed downstream band information table or the low-speed downstream band information table, the OLT monitoring controller deletes the destination address from the high-speed downstream band information table or the low-speed downstream band information table, and when a destination address extracted from the upstream signal packet has been recorded on a line coincident with a link identifier extracted from the upstream signal packet, the OLT monitoring controller clears the predetermined time lapse corresponding to the destination address.

14. The optical line terminal according to claim 10, wherein, in a case where the OLT monitoring controller detects that a trouble is eliminated in the high-speed OLT unit, under a condition that the trouble occurs in the high-speed OLT unit and thus the high-speed OLT unit is switched to the low-speed OLT unit, upon reception of a trouble notification of the high-speed ONU unit from a single ONU unit, the OLT monitoring controller instructs the ONU to switch from the first transmission speed to the second transmission speed when the low-speed ONU unit of the ONU has no trouble information, and when receiving a notification of recovery of the high-speed ONU unit from the single ONU, the OLT monitoring controller instructs the ONU to recover to the first transmission speed.

15. The optical line terminal according to claim 14, wherein, when no trouble occurs in the high-speed ONU units of plural connected ONUs, the OLT monitoring controller transmits a notification of recovery from the second transmission speed to the first transmission speed to the plural connected ONUs by using a line of the second transmission speed, switches the OLT switch unit to the high-speed OLT unit, and changes to refer of ASB of the shaper unit to the high-speed downstream band information table, and when receiving the recovery notification from the OLT, in some of the plural connected ONUs which are operated with the low-speed ONU units, the ONU monitoring controller switches the ONU switch unit to the high-speed ONU unit side, and transmits a recovery acknowledge signal to the OLT by using the line of the second transmission speed.

16. The optical line terminal according to claim 10, wherein the low-speed OLT unit is designed as external devices.

17. The optical line terminal according to claim 10, further comprising a power source with which the high-speed OLT unit is subjected to ON/OFF control, wherein the high-speed OLT unit is OFF-controlled at a predetermined time, under a predetermined condition or manually, and a switching operation is performed so that the passive optical network system is operated with the low-speed OLT unit.

* * * * *